US012624601B2

(12) United States Patent
Olsen et al.

(10) Patent No.: US 12,624,601 B2
(45) Date of Patent: May 12, 2026

(54) HORIZONTAL DIRECTIONAL DRILLING SYSTEM WITH DRILL STRING BREAKOUT MONITORING

(71) Applicant: Vermeer Manufacturing Company, Pella, IA (US)

(72) Inventors: Nicholas Hans Olsen, Pella, IA (US); Zachary Tanner Belloma, Ames, IA (US); Joseph Anthony Brandner, Renton, WA (US)

(73) Assignee: Vermeer Manufacturing Company, Pella, IA (US)

( * ) Notice: Subject to any disclaimer, the term of this patent is extended or adjusted under 35 U.S.C. 154(b) by 42 days.

(21) Appl. No.: 18/258,416

(22) PCT Filed: Dec. 22, 2021

(86) PCT No.: PCT/US2021/064939
§ 371 (c)(1),
(2) Date: Jun. 20, 2023

(87) PCT Pub. No.: WO2022/140593
PCT Pub. Date: Jun. 30, 2022

(65) Prior Publication Data

US 2024/0318538 A1 Sep. 26, 2024

Related U.S. Application Data

(60) Provisional application No. 63/129,876, filed on Dec. 23, 2020.

(51) Int. Cl.
*E21B 19/16* (2006.01)
*E21B 19/20* (2006.01)
(Continued)

(52) U.S. Cl.
CPC ............ *E21B 19/165* (2013.01); *E21B 19/20* (2013.01); *E21B 44/04* (2013.01); *G08B 21/18* (2013.01); *E21B 19/15* (2013.01)

(58) Field of Classification Search
CPC .......... E21B 44/04; E21B 7/046; E21B 19/15; E21B 19/20; E21B 19/165; G08B 21/18; E02F 5/18; E02F 9/267
See application file for complete search history.

(56) References Cited

U.S. PATENT DOCUMENTS 4,210,017 A 7/1980 Motsinger
4,957,002 A 9/1990 Coyle, Jr. et al.
(Continued)

FOREIGN PATENT DOCUMENTS

CA 2896003 C 1/2017
EP 0166082 A1 1/1986

OTHER PUBLICATIONS

International Search Report for corresponding International Application No. PCT/US2021/064939 mailed Mar. 3, 2022.
(Continued)

*Primary Examiner* — Nicole Coy
*Assistant Examiner* — Jennifer A Railey
(74) *Attorney, Agent, or Firm* — Michael Best & Friedrich LLP

(57) ABSTRACT

A drilling machine and operating method wherein a control algorithm evaluates a drill string joint-break routine. The operating profile of torque applied to the up-hole drill rod is monitored during energization of the break-out drive mechanism in the joint-break routine. Rotation at the rotational driver is also monitored during the joint-break routine, which is then characterized as normal or abnormal on the basis of the monitored operating profile of torque and the monitored rotational position change at the rotational driver.
(Continued)

A break-out process for removing the up-hole rod from the drill string is interrupted and/or a message is provided to a display notifying an operator of an abnormal break-out.

20 Claims, 18 Drawing Sheets

(51) Int. Cl.

| | |
|---|---|
| ***E21B 44/04*** | (2006.01) |
| ***G08B 21/18*** | (2006.01) |
| *E21B 19/15* | (2006.01) |

(56) References Cited

U.S. PATENT DOCUMENTS

| | | | | |
|---|---|---|---|---|
| RE34,063 | E * | 9/1992 | Vincent | E21B 19/166 702/41 |
| 6,179,065 | B1 | 1/2001 | Payne et al. | |
| 6,491,115 | B2 | 12/2002 | Van Houwelingen | |
| 7,631,563 | B2 | 12/2009 | Newman | |
| 7,819,183 | B2 | 10/2010 | Borgstadt | |
| 7,882,902 | B2 | 2/2011 | Boutwell, Jr. | |
| 7,891,418 | B2 | 2/2011 | Begnaud et al. | |
| 8,074,537 | B2 | 12/2011 | Hunter | |
| 8,899,319 | B2 | 12/2014 | Patterson et al. | |
| 9,453,377 | B2 | 9/2016 | Mosing et al. | |
| 10,167,688 | B2 | 1/2019 | Jelgert et al. | |
| 10,329,857 | B2 | 6/2019 | Hunter | |
| 10,808,472 | B2 | 10/2020 | Helms et al. | |
| 2009/0095526 | A1 | 4/2009 | Lane et al. | |
| 2012/0273230 | A1 * | 11/2012 | Patterson | E21B 19/165 166/77.51 |
| 2014/0116687 | A1 | 5/2014 | Ruehmann | |
| 2015/0107850 | A1 | 4/2015 | Mosing et al. | |
| 2015/0218895 | A1 | 8/2015 | Hassan et al. | |
| 2018/0363443 | A1 | 12/2018 | Guertin et al. | |
| 2019/0119997 | A1 | 4/2019 | Helms et al. | |
| 2019/0309878 | A1 * | 10/2019 | Ruehmann | E21B 10/62 |
| 2020/0047336 | A1 * | 2/2020 | Savini | G01L 5/00 |
| 2020/0263505 | A1 | 8/2020 | Schrinner et al. | |

OTHER PUBLICATIONS

"The Complete Guide to Machine Learning for Sensors and Signal Data", Reality AI, at least as early as Dec. 2018 (31 pages).

Dzaky Zakiyal Fawwaz, et al., "Real-Time and Robust Hydraulic System Fault Detection via Edge Computing", Applied Sciences, Aug. 2020, 10, 5933; doi:10.3390/app10175933 (19 pages).

Steven L. Brunton, et al., "Machine Learning for Fluid Mechanics", Annual Review of Fluid Mechanics, Jan. 2020 (32 pages).

Juying Dai, et al., "Signal Based Intelligent Hydraulic Fault Diagnosis Methods: Review and Prospects", Chinese Journal of Mechanical Engineering, Sep. 2019 (22 pages).

A. M. Gareev, et al., "Machine-Learning Algorithms for Helicopter Hydraulic Faults Detection: Model Based Research", Journal of Physics: Conference Series, 1368 (2019) (7 pages) at least as early as Dec. 2019.

* cited by examiner

HORIZONTAL DIRECTIONAL DRILLING SYSTEM WITH DRILL STRING BREAKOUT MONITORING

CROSS-REFERENCE TO RELATED APPLICATIONS

This application claims priority to U.S. Provisional Patent Application No. 63/129,876, filed Dec. 23, 2020, the entire contents of which are incorporated by reference herein.

BACKGROUND

The invention relates to horizontal directional drilling (HDD) systems that include a series of drill rods joined end to end to form a drill string that is propelled though the ground by means of powerful hydraulic systems on a HDD machine, having the capacity to rotate while simultaneously pushing or pulling the drill string, as discussed in U.S. Pat. Nos. 6,179,065 and 6,766,869, among numerous others. More particularly, the present disclosure relates to systems for making and breaking threaded joints between drill rods of the drilling machine.

Utility lines for water, electricity, gas, telephone, cable television, fiber optics, and the like are often run underground for reasons of safety and aesthetics. As an alternative to creating open trenches for placement of utility lines, underground drilling processes and systems have been developed for installing utilities underground. A directional drilling machine creates an underground utility passage from a launch point to a termination point. Known techniques can be used for steering the drilling machine during drilling so that the drilled bore follows a desired path. Relatively long bores can be drilled by coupling a relatively large number of drill rods together to form a drill string, each drill rod threaded to the adjacent rods in the drill string.

One type of directional drilling machine includes an elongate track (e.g., a rack) that can be aligned at an inclined orientation relative to the ground. A rotational driver (e.g., a gear box) is mounted on the track (e.g., by a carriage) so as to be movable along a drive axis that extends parallel to the length of the track. In certain examples, a rack and pinion drive is used to propel the rotational driver along the track. The rotational driver can include a drive member that is rotated by the rotational driver about the drive axis. The drive member is adapted for connection to a drill rod (e.g., a drill pipe). The drill rod can have a threaded end including either internal threads in a box-end or external threads in a pin-end.

To drill a bore using a directional drilling machine of the type described above, the track is oriented at an inclined angle relative to the ground, and the rotational driver is moved to an upper end of the track. Next, a drill rod is unloaded from a drill rod storage structure (e.g., a magazine) of the directional drilling machine and an upper end of the drill rod is coupled to the drive member of the rotational driver typically by a threaded connection. After the upper end of the drill rod has been coupled to the rotational driver, the lower end of the drill rod is coupled to a drill head if the drill rod is the first drill rod to be introduced into the ground, or to the upper-most drill rod of an existing drill string if the drill string has already been started. Thereafter, the rotational driver is driven in a downward direction along the inclined track while the drive member is concurrently rotated about the drive axis. As the rotational driver is driven down the track, the rotational driver transfers axial thrust and torque to the drill string. The axial thrust and torque is transferred through the drill string to the drill head thereby causing a cutting element (e.g., a bit) of the drill head to rotationally bore through the ground. The length of the bore is progressively increased as drill rods are progressively added to the drill string. The drill rods are most commonly secured together by threaded connections at joints between the drill rods. The drilling process requires numerous instances of adding another rod to the drill string, referred to as the make-up process as this is how one progressively makes up the drill string from individual drill rods.

After a bore has been drilled, it is necessary to pull back the drill string to remove the drill string from the bore. During the pull-back process, drill rods of the drill string are individually withdrawn from the ground, uncoupled from the drill string, and returned to the drill rod storage structure. Often, back reaming is done as part of the pull-back process. To uncouple a withdrawn drill rod from the remainder of the drill string, the threaded coupling between the withdrawn drill rod and the subsequent drill rod of the drill string is required to be broken before the withdrawn drill rod can be returned to the rod storage structure. This is referred to as the break-out process. Due to the torque loads associated with drilling and back reaming, threaded couplings between drill rods of a drill string can become quite tight and difficult to break.

Drilling machines have incorporated components and features for increasing efficiency relating to drill rod handling and relating to breaking and making joints. For example, linear and/or pivotal rod handling devices can be provided on drilling machines for moving drill rods between a rod storage structure and a drive axis of a rotational driver. Example rod handling devices are disclosed by U.S. Pat. Nos. 5,556,253; 5,607,280; 6,332,502; and 6,543,551. Also, one or more vises can be provided on the drilling machine for facilitating making and breaking threaded joint connections. Example vise arrangements for use with drilling machines are disclosed by U.S. Pat. No. 9,598,905; U.S. Patent Application Publication No. US 2009/0095526; and PCT Publication No. WO 2017/020008. Further, systems for applying a lubricant such as grease to the threaded joints of drill rods have been developed to facilitate breaking joints after drilling. U.S. Pat. No. 6,550,547 discloses a system on a drilling machine for applying grease to the threaded ends of drill rods.

Directional drilling machines can use different styles of drilling rods such as singular pipes, or dual-pipe style drilling rods where each drilling rod includes an inner pipe positioned within an outer pipe to facilitate independent rotation of the inner and outer pipes. Regardless of the type of drill rod used, there are a number of factors that affect the machine's ability to successfully break joints between drill rods. Operators remain responsible for observing and diagnosing how the joints are broken and whether or not problems may have occurred during the process.

SUMMARY

In one aspect, the invention provides a drilling machine including, among other things, a control system with a control algorithm for evaluating a joint-break routine configured to rotate a second vise relative to a first vise to break the joint between the up-hole rod and the drill string. The control algorithm comprises: A) a process for monitoring an operating profile of torque applied to the up-hole drill rod by energization of the break-out drive mechanism during the joint-break routine while the drill string is being held by the first vise, B) a process for monitoring rotational position change at the rotational driver during the joint-break routine, C) a process for characterizing the joint-break routine as normal or abnormal based on the monitored operating profile of torque and the monitored rotational position change at the rotational driver, and D) a process, responsive to the characterizing process characterizing the joint-break routine as abnormal, for interrupting a break-out process for removing the up-hole rod from the drill string and/or providing a notification to a display notifying an operator.

In another aspect, the invention provides a method of operating a drilling machine. A drill string is provided on the drilling machine, the drill string including a threaded joint between an up-hole drill rod at an up-hole end of the drill string and a remainder of the drill string. The up-hole drill rod is attached to a rotational driver of the drilling machine. The remainder of the drill string is clamped with a first vise. The up-hole drill rod is clamped with a second vise. A break-out drive mechanism is energized to apply torque to the second vise in a joint-break routine configured to rotate the second vise relative to the first vise to break the joint between the up-hole rod and the drill string. A control system operates to execute a control algorithm that evaluates the joint-break routine, the execution of the control algorithm comprising: A) monitoring an operating profile of torque applied to the up-hole drill rod by energization of the break-out drive mechanism during the joint-break routine while the drill string is being held by the first vise, B) monitoring rotational position change at the rotational driver during the joint-break routine, C) characterizing the joint-break routine as normal or abnormal based on the monitored operating profile of torque and the monitored rotational position change at the rotational driver, and D) responsive to the characterizing process characterizing the joint-break routine as abnormal, interrupting a break-out process for removing the up-hole rod from the drill string and/or providing a notification to a display notifying an operator.

In another aspect, the invention provides a drilling machine including a rotational driver for attaching to an up-hole end of a drill string made-up of a plurality of drill rods that are each secured to the next by a threaded joint. A break-out drive mechanism of the drilling machine is operable when energized to apply torque in a first joint-break routine configured to break the joint between a down-hole end of an up-hole rod and the drill string. The rotational driver is operable when energized to apply torque in a second joint-break routine configured to break a joint between an up-hole end of the up-hole drill rod and the rotational driver. A control system of the drilling machine includes a control algorithm for evaluating at least one of the first and second joint-break routines. The control algorithm includes: A) a process for monitoring an operating profile of torque applied to the up-hole drill rod by energization of the break-out drive mechanism during the joint-break routine while the drill string is being held by the first vise, B) a process for monitoring rotational position change at the rotational driver during the joint-break routine, C) a process for characterizing the joint-break routine as normal or abnormal based on the monitored operating profile of torque and the monitored rotational position change at the rotational driver, and D) a process, responsive to the characterizing process characterizing the joint-break routine as abnormal, for interrupting a break-out process for removing the up-hole rod from the drill string and/or providing a notification to a display notifying an operator.

In yet another aspect, the invention provides a method of operating a drilling machine. A drill string is provided on the drilling machine, the drill string including a threaded joint between an up-hole drill rod at an up-hole end of the drill string and a remainder of the drill string, the up-hole drill rod attached to a rotational driver of the drilling machine. The remainder of the drill string is clamped with a first vise. The up-hole drill rod is clamped with a second vise. A break-out drive mechanism is energized to apply torque to the second vise in a joint-break routine configured to rotate the second vise relative to the first vise to break the joint between the up-hole rod and the drill string. A control system is operated to execute a control algorithm that evaluates the joint-break routine, the execution of the control algorithm comprising: A) monitoring an operating profile of torque applied to the up-hole drill rod by energization of the break-out drive mechanism during the joint-break routine while the drill string is being held by the first vise, B) monitoring rotational position change at the rotational driver during the joint-break routine, C) characterizing the joint-break routine as normal or abnormal based on the monitored operating profile of torque and the monitored rotational position change at the rotational driver, and D) responsive to the characterizing process characterizing the joint-break routine as abnormal, interrupting a break-out process for removing the up-hole rod from the drill string and/or providing a notification to a display notifying an operator.

DETAILED DESCRIPTION

Before any embodiments of the present invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
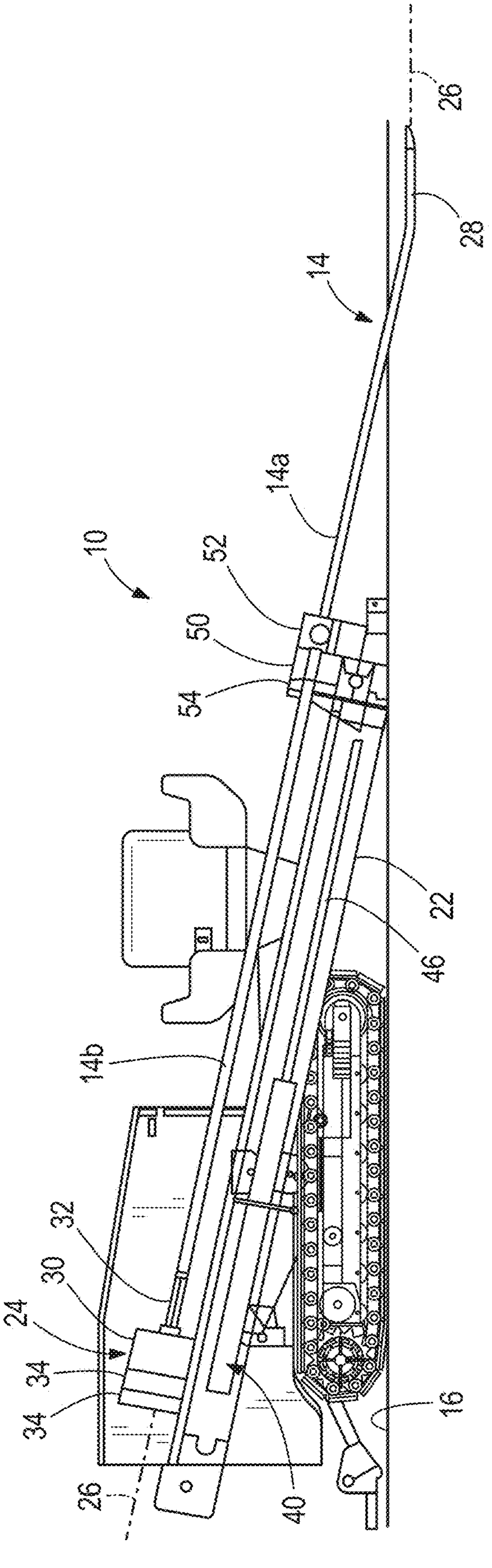
FIG. 1 is a side view of an operating horizontal directional drilling machine.

The drilling machine 10 of FIG. 1 is adapted for pushing a drill string 14 into the ground 16 in a first or down-hole direction, and for pulling the drill string 14 from the ground 16 in a second or up-hole direction opposite the down-hole direction. The drill string 14 includes a plurality of drill rods (e.g., two of the drill rods 14*a*, 14*b* are shown and referred to below) that are connected end-to-end, by sequential couplings made on the drilling machine 10. A drill head 28 is generally mounted at a remote or down-hole end of the drill string 14 to facilitate driving the drill string 14 into the ground 16. The drill head 28 may include, for example, a cutting bit assembly, a starter rod, a fluid hammer, a sonde holder, as well as other components. Each of the drill rods 14*a*, 14*b* includes a mechanism for connection therebetween, such as threaded ends. A pin-end having external threads on one end of one rod 14*a*, for example, may be threaded into a box-end having internal threads on the adjacent rod 14*b*. The series of rods coupled in such a manner comprises the drill string 14.

The drilling machine 10 includes an elongated guide or track (e.g., rack) 22 that can be positioned by an operator at any number of different oblique angles relative to the ground 16. A rotational driver 24 is mounted on the rack 22. The rotational driver 24 is adapted for rotating the drill string 14 in forward and reverse directions about a longitudinal axis 26 of the drill string 14. As used herein, the terms "forward direction" and "forward torque" refer to the direction of rotation of the drill string that tends to engage or tighten the threads of drill rods 14*a* and 14*b*. For example, if drill rods 14*a* and 14*b* have right-hand threads, the forward direction of rotation or torque is in a clockwise direction. The terms "reverse direction" and "reverse torque" refer to the direction of rotation of the drill string that tends to loosen or disengage the threads of drill rods 14*a*, 14*b*. Terms such as "upper" and "lower" may be used to describe the relative positions of machine components as well as the positions of the drill rods 14*a*, 14*b* used therewith. Because the machine 10 is configured to orient the rack 22 along a tilted or diagonal axis with respect to the ground (with well-established forward and rearward thrust directions of operation), the terms "upper" and "lower" are appropriate, as are "rearward" and "forward" or "up-hole" and "down-hole." With particular reference to the up-hole drill rod 14*b* that gets removed by a break-out process, this may also be referred to as the withdrawn rod 14*b* since it has been retracted or withdrawn from the borehole, while the adjacent drill rod 14*a* in front of it may still be partially within the borehole.

The rotational driver 24 includes a gear box 30 having an output shaft or drive spindle 32 (i.e., a drive chuck or drive shaft). The gear box 30 may be powered by hydraulics, pneumatics, electricity, internal combustion engine, or any other technology or device known for generating torque. In the illustrated example, the gear box 30 is powered by one or more hydraulic motors 34 (e.g., a fixed-displacement hydraulic motor connected to a variable displacement hydraulic pump to form a hydrostatic drive).

A control system or "controller" 100 (FIG. 3) of the drilling machine 10 is configured to control the direction, speed, and torque produced by the motor 34 (e.g., by controlling output of the variable hydraulic pump connected to the motor 34, or in other constructions controlling the supply of electrical power to an electric motor). The controller 100 may include one or more electronic processors and one or more memory devices. The controller 100 may be communicably connected to one or more sensors or other inputs, such as described herein. The electronic processor may be implemented as a programmable microprocessor, an application specific integrated circuit (ASIC), one or more field programmable gate arrays (FPGA), a group of processing components, or with other suitable electronic processing components. The memory device (for example, a non-transitory, computer-readable medium) includes one or more devices (for example, RAM, ROM, flash memory, hard disk storage, etc.) for storing data and/or computer code for completing the or facilitating the various processes, methods, layers, and/or modules described herein. The memory device may include database components, object code components, script components, or other types of code and information for supporting the various activities and information structure described in the present application. According to one example, the memory device is communicably connected to the electronic processor and may include computer code for executing one or more processes described herein. The controller 100 may further include an input-output ("I/O") module. The I/O module may be configured to interface directly interface with one or more devices, such as a power supply, sensors, displays, etc. In one embodiment, the I/O module may utilize general purpose I/O (GPIO) ports, analog inputs/outputs, digital inputs/outputs, and the like.

It will be appreciated that different numbers of motors 34 may be coupled to the gear box 30, depending largely upon the amount of torque that is desired to be generated by the rotational driver 24. The gear box 30 can be configured, along with providing a mechanical gear-reduction, to provide the structural support for the rotational driver 24. The drive spindle 32 mounted in the rotational drive gear box 30 is connected to the gear reduction system so that it rotates at a speed slower than the output of the rotational drive motor 34, with resulting higher torque capacity. The drive spindle 32 is also supported by bearings in the rotational drive motor 34 that provide the capability for the drive spindle 32 to carry the longitudinal loads required to thrust the drill string 14 forward during boring operations, and required to pull the drill string 14 and reamer back during pull-back. The drive spindle 32 is typically hollow, providing a fluid flow passage for drilling fluids to be pumped down-hole during the drilling process. Rather than directly engaging the drill string 14 with the drive spindle 32, a sub saver 32A (FIG. 2) is provided as a separate, replaceable element for establishing drive connection between the rotational driver 24 and the drill string 14. Thus, the threads on the drive spindle 32 are protected from constant threading and unthreading during operation of the drilling machine 10.

The rotational driver 24 is adapted to slide longitudinally up and down the rack 22. For example, the rotational driver 24 can be mounted with slides 35 on a carriage 36 (FIG. 2) that slidably rides on rails of the rack 22. The slides 35 allow the gear box 30 to move/slide in the longitudinal direction along the rack 22 without the carriage 36 moving. A hydraulic cylinder (not shown) can be provided to control the movement of the gear box 30 along the slides 35. A thrust mechanism 40 is provided for propelling the rotational driver 24 along the rack 22. For example, the thrust mechanism 40 drives the rotational driver 24 to advance in a forward/downward direction to push the drill string 14 in the ground 16. By contrast, the thrust mechanism 40 drives the rotational driver 24 to retract in a rearward/upward direction to remove the drill string 14 from the ground 16. It will be appreciated that the thrust mechanism 40 can have any number of known configurations. For example, the carriage 36 can have a connection to longitudinal drive element associated with the rack, e.g., pinion gears of thrust/pullback motors engaged with a rack gear of the rack. Other constructions may provide the thrust mechanism 40 with a hydraulic cylinder, or a chain- or belt-drive mechanism.

Figure 2:
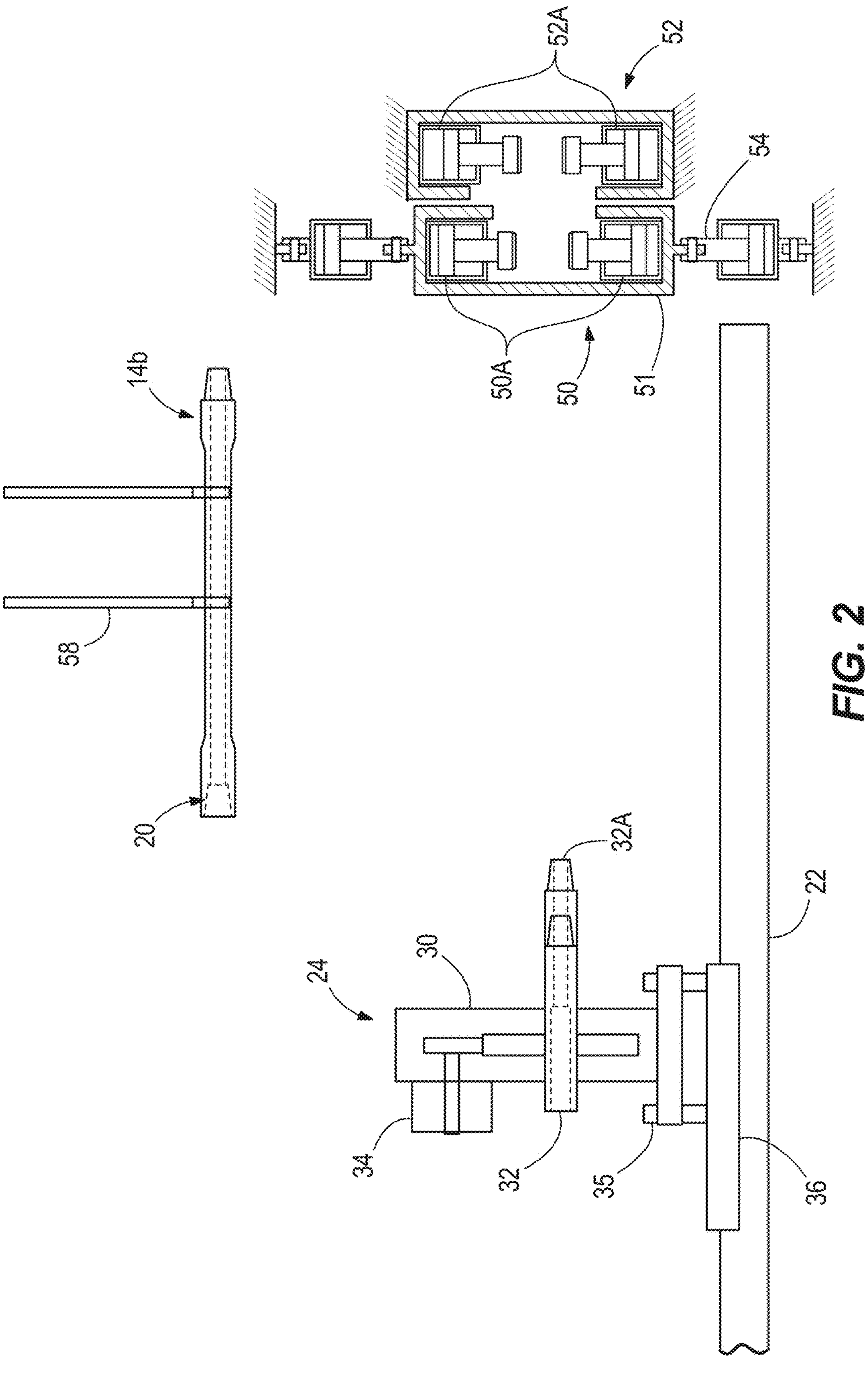
FIG. 2 is a schematic view of several of the system components of the horizontal directional drilling machine.

Referring still to FIG. 1 and also FIG. 2, the drilling machine 10 further includes upper and lower gripping units 50, 52 for use in coupling and uncoupling the drill rods 14*a* and 14*b* of the drill string 14. The upper and lower gripping units 50, 52 may also be considered rear and front gripping units, respectively, although the terms "upper" and "lower" are used below for simplicity. The upper gripping unit 50 includes a break-out drive mechanism 54 (e.g., one or more hydraulic cylinders) for rotating the upper gripping unit 50 about the longitudinal axis 26 of the drill string 14. The gripping units 50 and 52 can be configured as vise grips that, when closed by one or more hydraulic vise cylinders 50A, 52A, grip the drill string 14 with sufficient force to prevent the drill string 14 from being rotated by the rotational driver 24. More particularly, the upper gripping unit 50 includes the upper vise cylinder 50A having a vise die, and there can be one, two or more of the upper vise cylinders 50A. The figures in this disclosure show a pair of upper vise cylinders 50A. The figures also show a pair of breakout cylinders 54 pivotally connected to a vise frame 51 on one end, the vise frame 51 supporting the upper vise cylinders 50A, and pivotally connected to a frame structure on a second end, either the fixed main frame structure of the machine 10 or a sliding frame mounted thereon. The vise frame 51 can be supported by a positioning mechanism (not shown) that allows it to rotate about the theoretical center axis of the lower vise 52 when the breakout cylinders 54 are extended or retracted. When extended, the breakout cylinders 54 cause the vise frame 51 and the upper vise cylinders 50A to rotate, along with the attached vise dies, about the theoretical center axis of a lower vise 52, in a direction to unthread a drill rod onto which the upper gripping unit 50 is clamped. Similarly, the lower gripping unit 52 is shown to include two lower vise cylinders 52A with vise dies attached. The lower gripping unit 52 can be configured with one, two or in some cases three or more cylinders. When the cylinders 52A are extended, with a drill rod positioned within the lower vise assembly 52, the vise dies clamp onto the drill rod and prevent it from rotating while also holding it from moving longitudinally.

Figure 3:
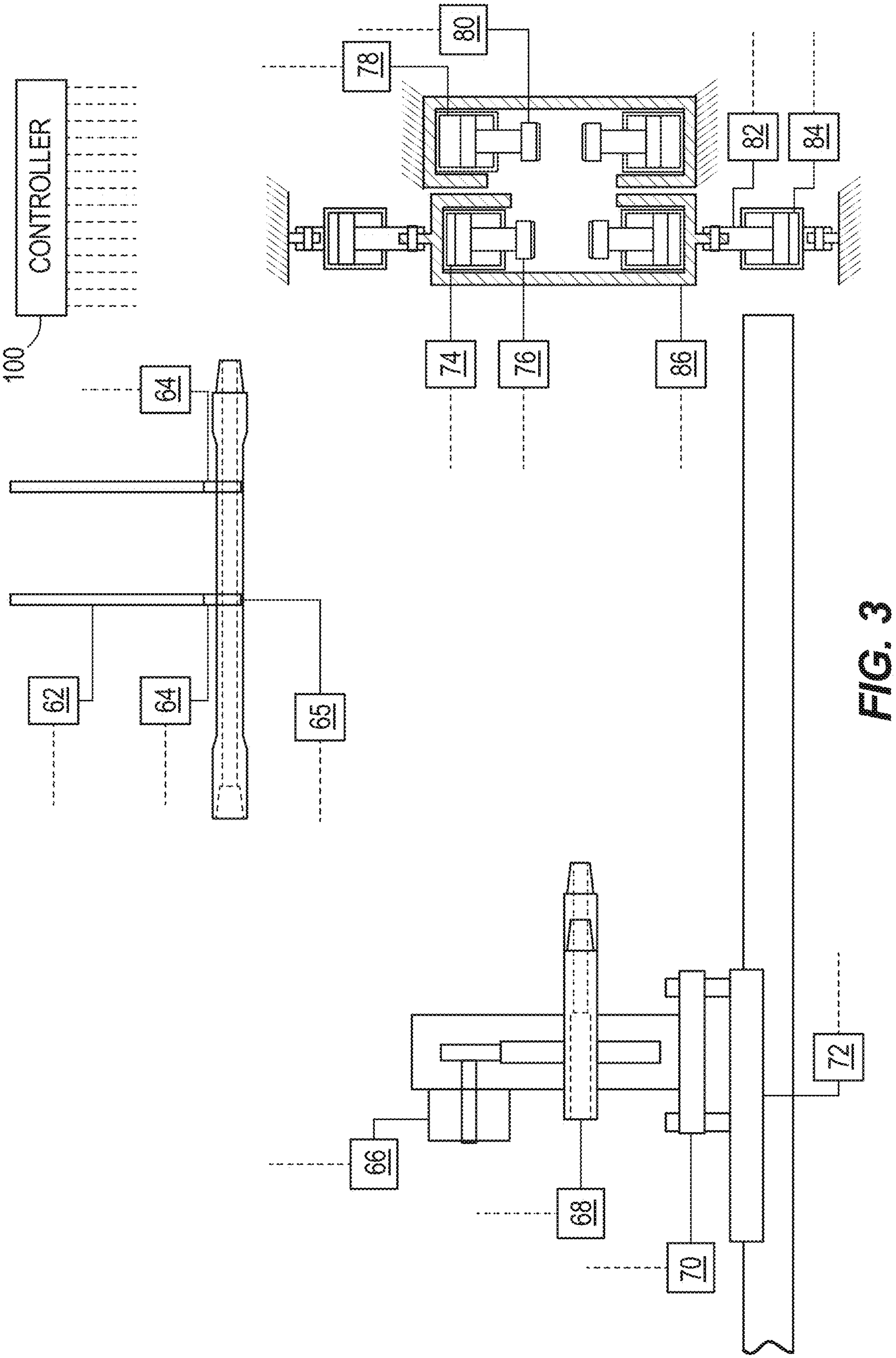
FIG. 3 is a schematic view of several of the system sensors of the horizontal directional drilling machine.

The drilling machine 10 can be provided with a plurality of sensors that detect various values and communicate corresponding signals to the controller 100 as shown in FIG. 3. Among others not mentioned herein, sensors of the drilling machine 10 can include any or all of:

- a rod loader arm position sensor 62 operable to detect the position of the rod loader arms 58;
- a rod loader arm grip sensor 64 operable to detect a drill rod grasped by the rod loader arm(s) 58 (each arm 58 may have a separate sensor 64);
- a rod loader arm grip pressure sensor 65 operable to detect grip pressure applied by the rod loader arm(s) 58 (1 sensor per rod loader arm or 1 sensor per hydraulic circuit shared by multiple arms 58);
- a rotational drive torque sensor 66 operable to detect torque at the rotational driver 24, directly or through a related parameter such as force or hydraulic fluid pressure that correlates to torque generated;
- a rotational position sensor 68 (e.g., encoder) operable to detect a rotational position of the spindle 32 of the rotational driver 24, or the rotational movement of the drive spindle 32, with the ability to measure direction of rotation;
- a gearbox float position sensor 70 operable to measure the position of the gearbox 30 along the gearbox slide 35 (i.e., any type of transducer that allows relative position to be measured, or sensors that detect the position of the gearbox 30 at discrete locations, such as at on end or the other);
- a carriage position sensor 72 (e.g., encoder) operable to detect a position of the carriage 36 and rotational driver 24 along the rack 22;
- an upper vise cylinder pressure sensor 74 operable to detect a cylinder pressure at the upper vise 50;
- an upper vise cylinder position sensor 76 operable to detect a position of the upper vise cylinder 50A (provided by one or more sensing elements detecting position directly, or one or more sensing elements detecting another parameter that can be correlated to cylinder position such as a pair of pressure sensors configured to measure the respective pressures at opposite sides of the cylinder);

a lower vise cylinder pressure sensor 78 operable to detect a cylinder pressure at the lower vise 52;

a lower vise cylinder position sensor 80 operable to detect a position of the lower vise cylinder 52A (provided by one or more sensing elements detecting position directly, or one or more sensing elements detecting another parameter that can be correlated to cylinder position such as a pair of pressure sensors configured to measure the respective pressures at opposite sides of the cylinder);

a break-out position sensor 82 operable to detect a position of the break-out drive mechanism 54 on the upper vise 50 (provided by one or more sensing elements detecting position directly, or one or more sensing elements detecting another parameter that can be correlated to position such as a pair of pressure sensors configured to measure the respective pressures at opposite sides of a cylinder that controls the position of the break-out drive mechanism 54);

a break-out torque sensor 84 operable to detect a torque generated at the break-out drive mechanism 54 on the upper vise 50, directly or through a related parameter such as force that manifests as torque, or hydraulic fluid pressure in a cylinder that causes a force that manifests as torque, such that the measured parameter correlates to torque generated and thus, torque applied to the drill string joint; and an upper vise position sensor 86 operable to detect a longitudinal position of the upper vise 50 (provided by one or more sensing elements detecting position of the upper vise 50 directly, or one or more sensing elements detecting another parameter that can be correlated to position such as a pair of pressure sensors configured to measure the respective pressures at opposite sides of a cylinder that controls the longitudinal position of the upper vise 50).

As is known in the art, the rotational driver 24, along with the lower gripping unit 52 are utilized to build up the drill string 14 by threading on the first drill rod 14*a* to the drill head 28, then threading on the second drill rod 14*b* to the first drill rod 14*a* and so on, with the machine 10 thrusting the drill string 14 into the ground by the length of one drill rod prior to the attachment of the next sequential drill rod. Generally speaking, the rotational driver 24 rotates the properly-aligned, to-be-added drill rod in a forward direction, causing the sub saver 32A to thread into the box-end 20 of the drill rod, and causing the pin-end of the drill rod to concurrently thread into the box-end of the prior-connected drill rod (or into the drill head 28 in the case of the first drill rod 14*a*). The lower gripping unit 52 prevents rotation of the already-installed portion of the drill string 14 by gripping onto the trailing or up-hole end thereof. The forward torque used to make the threaded connection between the rotational driver 24 and the drill string 14 is called the "make-up torque," and the magnitude of the make-up torque is dependent upon the diameter or size of the elongated members being used. However, for a given set of equipment parameters, the make-up torque will be known, and this may be given in terms of torque units, or hydraulic pressure units corresponding directly to the torque resulting from the applied pressure. Although the steps for construction of the drill string 14 can be individually commanded by a human operator from a set of on-machine or remote controls, it is also contemplated to have the process, or portions thereof, performed via the controller 100. For example, the human operator may simply select an "automatic rod exchange" function from an interface or control panel in communication with the controller 100.

After the first drill rod 14*a* has been coupled to the sub saver 32A and the drill head 28, the lower gripping unit 52 releases the drill rod 14*a* and the rotational driver 24 is propelled in a downward direction along the rack 22 such that the drill rod 14*a* is pushed into the ground 16. As the drill rod 14*a* is pushed into the ground 16, the rotational driver 24 preferably rotates the drill rod 14*a* such that the drill head 28 provides a boring or drilling action. After the drill rod 14*a* has been pushed into the ground 16 by the full stroke of the rotational driver 24, the trailing end of the drill rod 14*a* is gripped by the lower gripping unit 52 to prevent rotation of the drill rod 14*a*. Once the trailing end of the drill rod 14*a* has been gripped by the lower gripping unit 52, the rotational driver 24 applies a reverse torque to break the joint formed between the sub saver 32A and the drill rod 14*a*. The torque used to break a joint can be referred to as the "break-out torque." Thus, when it is desired to break a joint, a reverse torque provided by the rotational driver 24 of sufficient torque is provided in order to break the joint. This will be referred to herein as a joint-break. Once the joint has been broken, the sub saver 32A is further rotated to completely unthreaded from the drill rod 14*a*, and the rotational driver 24 is moved upward along the rack 22 to the uppermost position (e.g., the position shown in FIG. 1). The next drill rod 14*b* is placed in alignment with the preceding drill rod 14*a* and the sub saver 32A, and the sequence described above is repeated for this and other drill rods to the extend necessary to build up the drill string 14 for the drilling operation. Drill rod handling between a storage location and the operational space between the drill string 14 and the sub saver 32A can be carried out through one or more loader arms 58.

Figure 4:
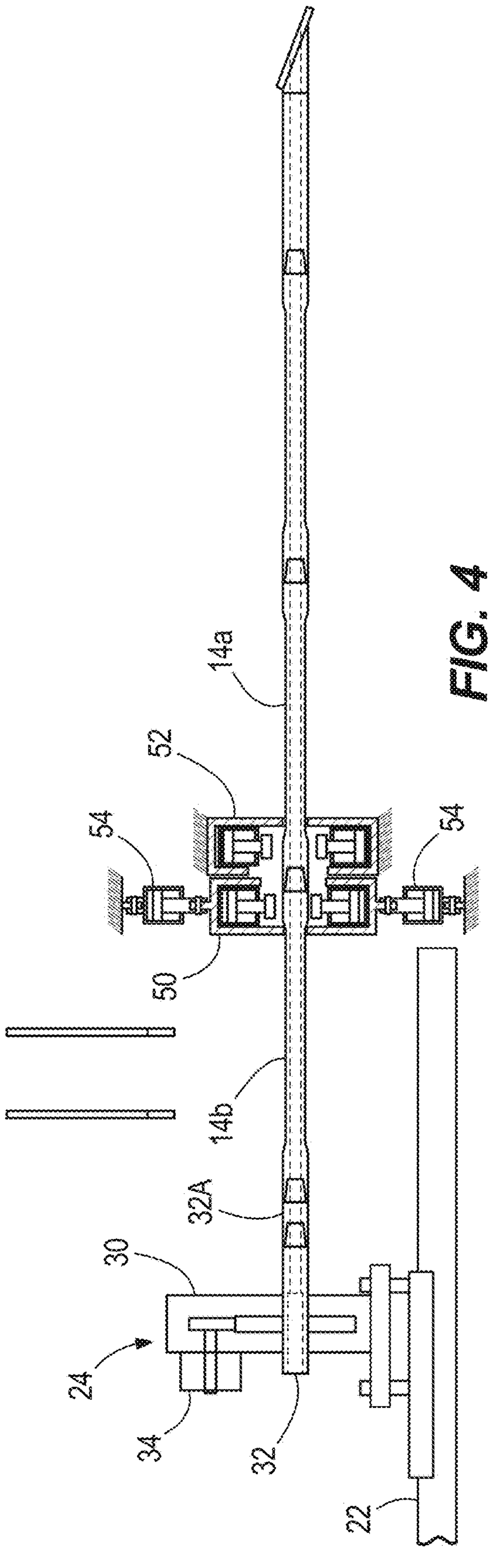
FIG. 4 is a schematic view showing the horizontal directional drilling machine configured to begin breaking a rod joint.
Figure 5:
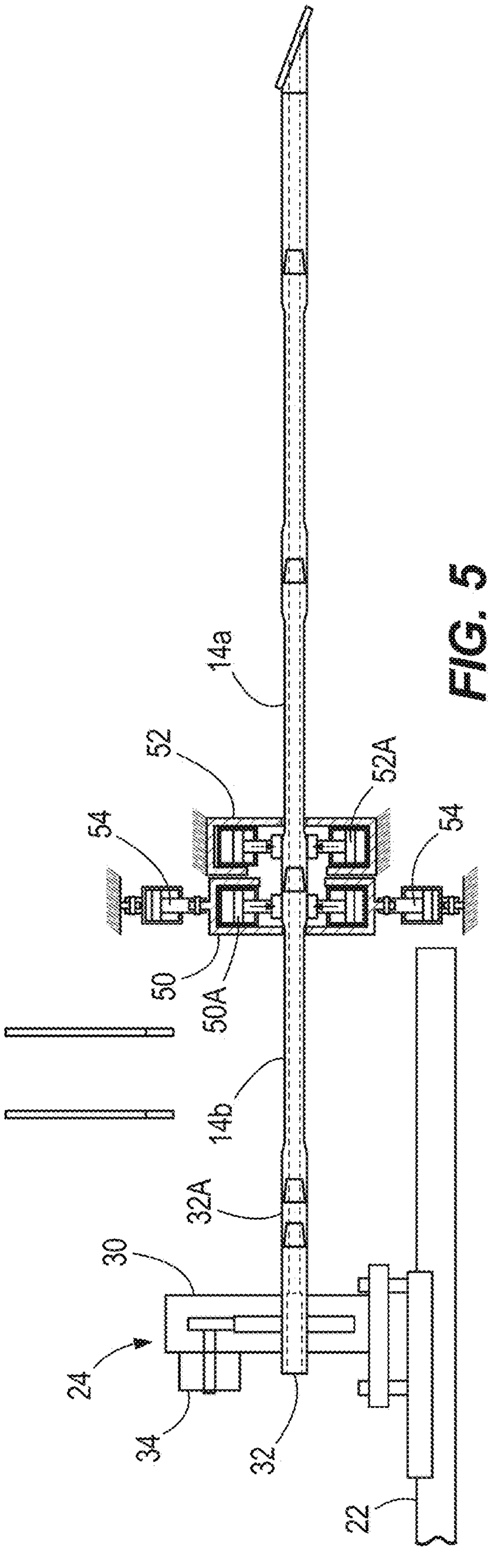
FIG. 5 is a schematic view illustrating a further step in the process of breaking a rod joint. The upper and lower gripping units clamp the respective drill rods.
Figure 6:
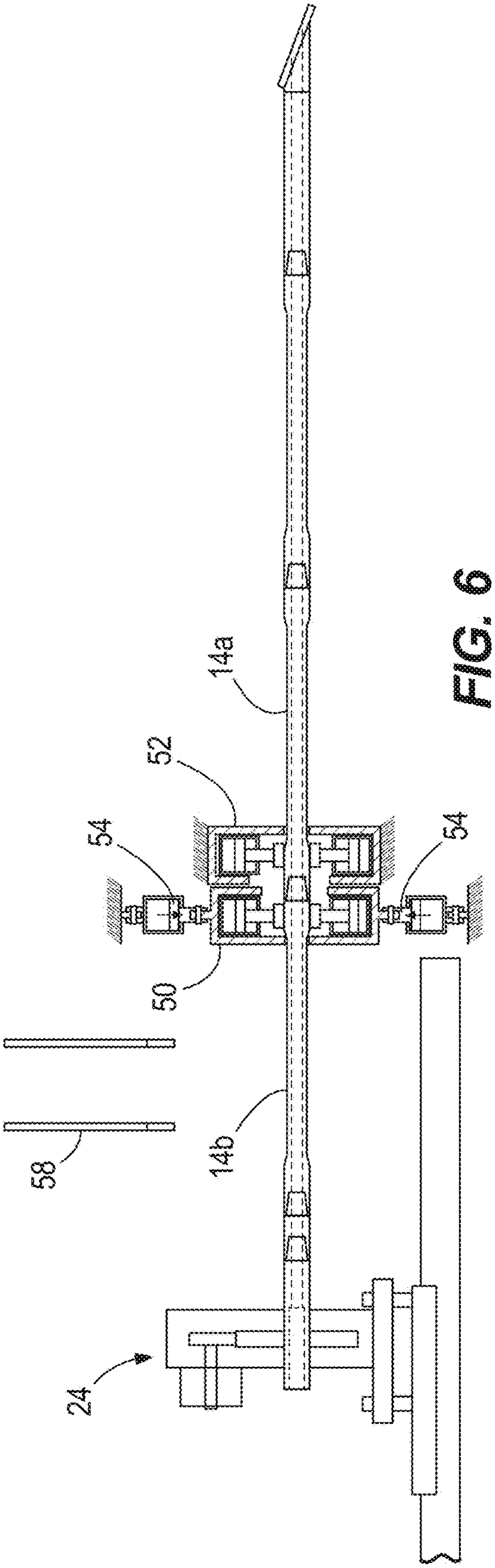
FIG. 6 is a schematic view illustrating a further step in the process of breaking a rod joint. The breakout cylinders are extended to rotate the upper gripping unit.

Following completion of the drilling operation, the drill string 14 is pulled back out of the ground by the machine 10 during a "pullback" operation. During pullback, the rearmost remaining drill rod on the drill string 14 is detached from the adjacent down-hole drill rod of the drill string 14 and placed back into a storage location, e.g., by the loader arms 58. In the illustrated embodiment, this is described with respect to the forward or down-hole drill rod 14*a* and the rearward or up-hole drill rod 14*b*, although it will be appreciated that the process is likely to take place numerous times to sequentially break down each and every drill rod that was initially assembled to form the drill string 14. To withdraw the drill string 14 from the ground 16, the rotational driver 24 is moved upward along the rack 22 from a lower position to an upper position as shown in FIG. 4. As the rotational driver 24 moves upward, the rearward drill rod 14*b* is pulled from the ground 16. When the rotational driver 24 reaches the position at which the joint lower end of the rearward drill rod 14*b* passes the lower gripping unit 52, the withdrawn up-hole drill rod 14*b* is gripped by the upper gripping unit 50 and the adjacent down-hole drill rod 14*a* is gripped by the lower gripping unit 52 as shown in FIG. 5. Thereafter, the upper gripping unit 50 is rotated about the longitudinal axis 26 by actuating the break-out drive mechanism 54 as shown in FIG. 6 to break the threaded joint between the two drill rods 14*a* and 14*b*. The break-out drive mechanism 54 is responsible for supplying the break-out torque to break the threaded joint between the adjacent drill rods 14*a* and 14*b*, through a limited rotation range (e.g., 90 degrees or less, and in some cases just a few degrees such as 15 degrees or less), the joint-break. In this context, the term "break" refers to the initial change in relative angular position between the drill rods 14*a*, 14*b*, which requires significantly greater torque than the remaining unthreading of the joint to separate the rods 14*a*, 14*b*. Under normal circumstances, the rearward drill rod 14*b* is still threaded tightly to the sub saver 32A on the rotational driver 24 at this time. During actuation of the break-out drive mechanism 54 to break the joint, the rotational driver 24 is not powered, and can rotate freely with the rearward drill rod 14*b*, under the break-out torque from the break-out drive mechanism 54. During this step the rotational driver 24 is free to move longitudinally as well, as the rotation of the rearward drill rod 14*b* relative to the forward drill rod 14*a* will cause the rearward drill rod 14*b* to move slightly along the longitudinal or axial direction as a result of the pitch of the threads.

Figure 7:
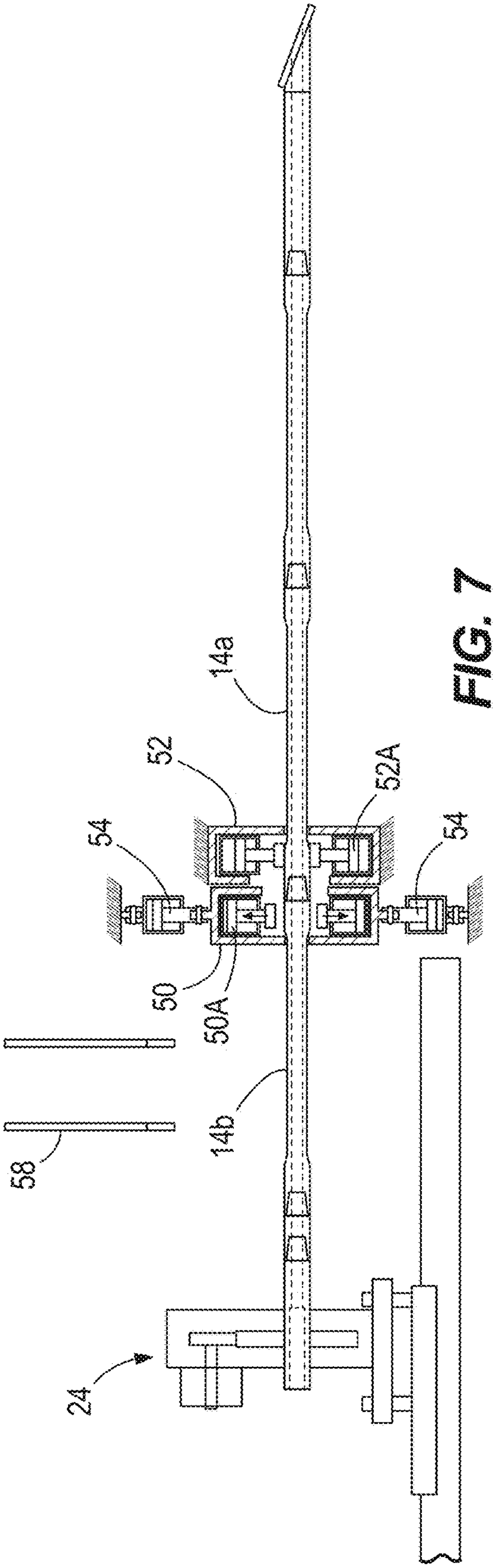
FIG. 7 is a schematic view illustrating a further step in the process of breaking a rod joint. The upper gripping unit releases the upper drill rod.
Figure 8:
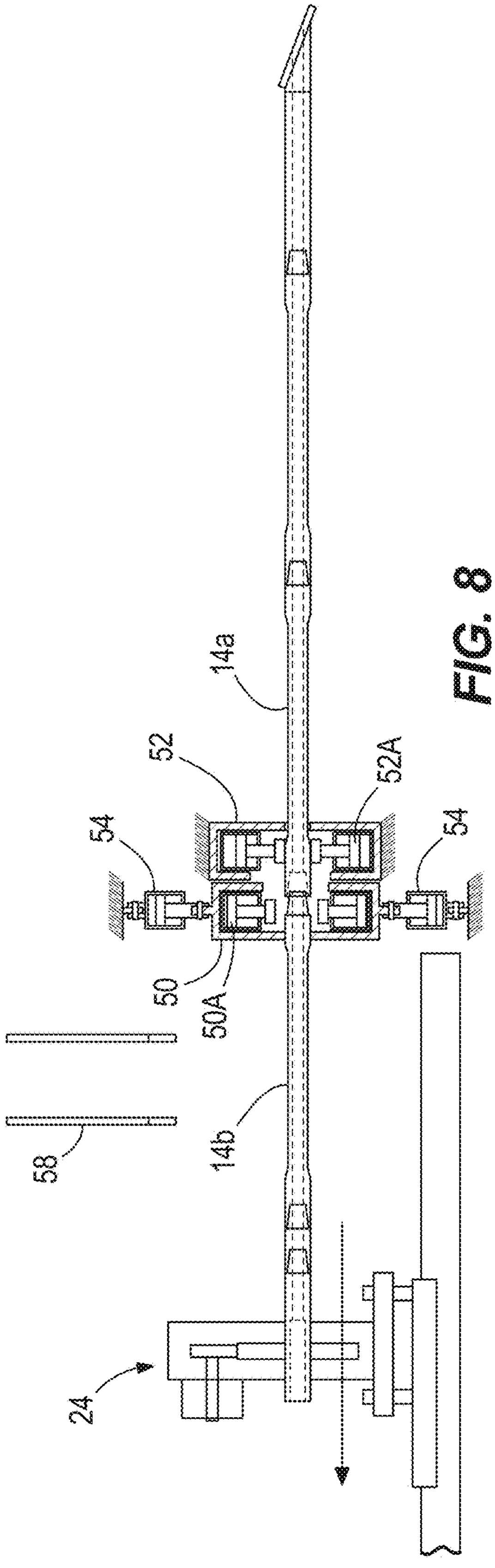
FIG. 8 is a schematic view illustrating a further step in the process of breaking a rod joint. The rotational driver unthreads the upper drill rod from the lower drill rod, which remains clamped by the lower gripping unit.

Once the joint between the two drill rods 14*a*, 14*b* has been broken by the break-out drive mechanism 54 at the upper gripping unit 50, the vise cylinder 50A at the upper gripping unit 50 is released as shown in FIG. 7. In the next step of the process, the rotational driver 24 applies reverse torque to the rearward drill rod 14*b* to continue unthreading it from the forward drill rod 14*a* as shown in FIG. 8. In particular, FIG. 8 illustrates how the drill rod 14*b* has moved backward as a result of the pitch of the threads, and the rotational driver 24 has slid backward via the gearbox slides 35. During this step the carriage 36 does not have to change position along the rack 22, as the longitudinal movement of the rotational driver is provided by the slides 35. However, it would be possible that the carriage 36 could be moved along the rack 22 during this step.

Figure 9:
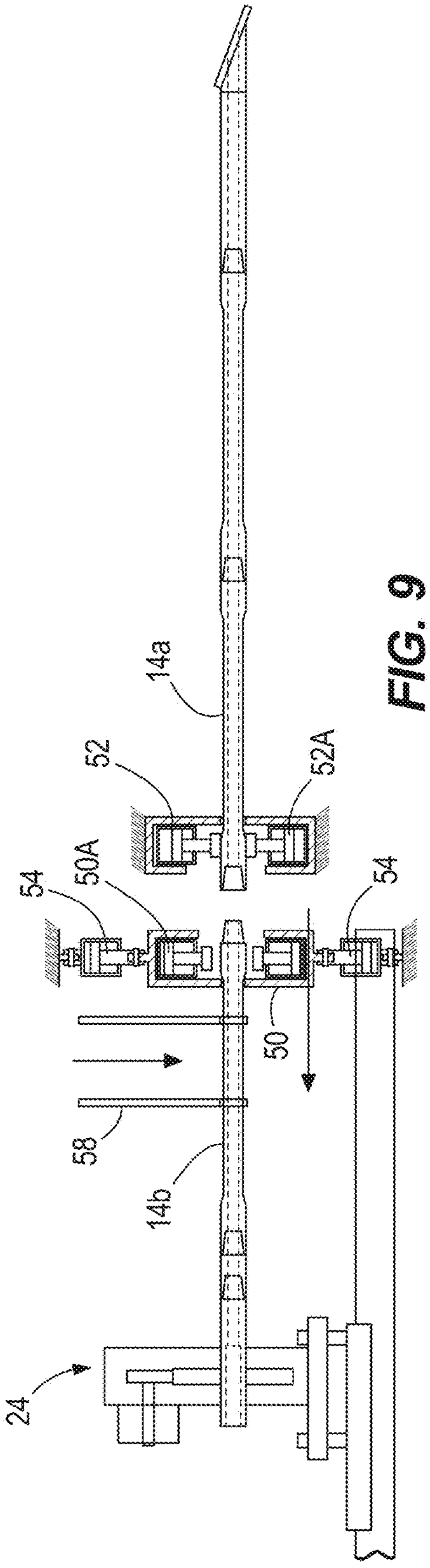
FIG. 9 is a schematic view showing the horizontal directional drilling machine configured to begin breaking a second joint on the drill rod. The upper gripping unit is slid to a rearward position.
Figure 10:
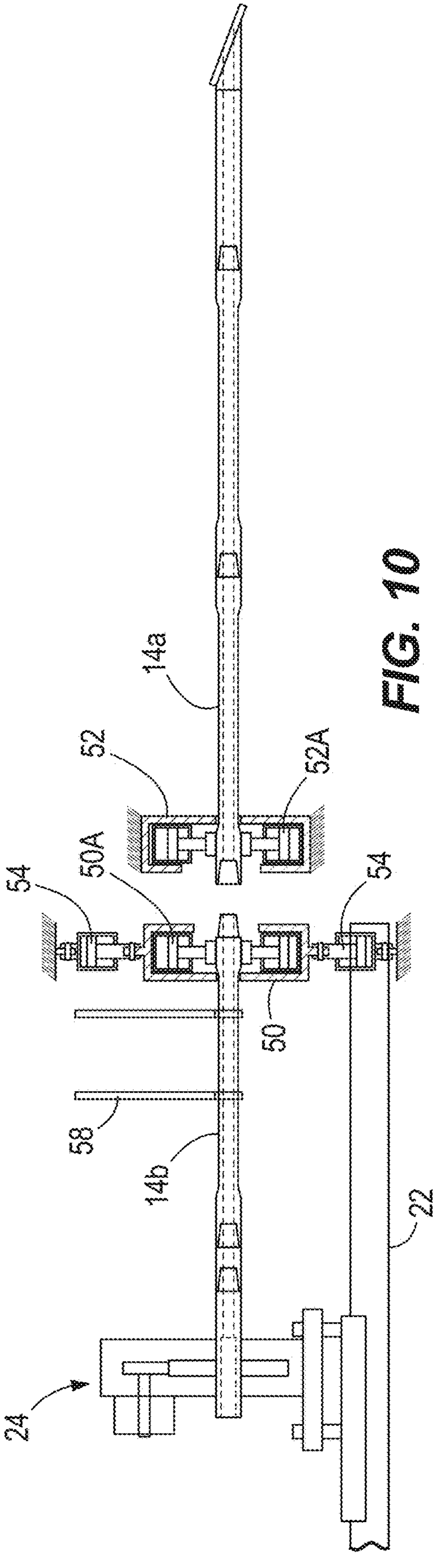
FIG. 10 is a schematic view illustrating a further step in the process of breaking the second rod joint. The upper gripping unit clamps the down-hole end of the drill rod.
Figure 11:
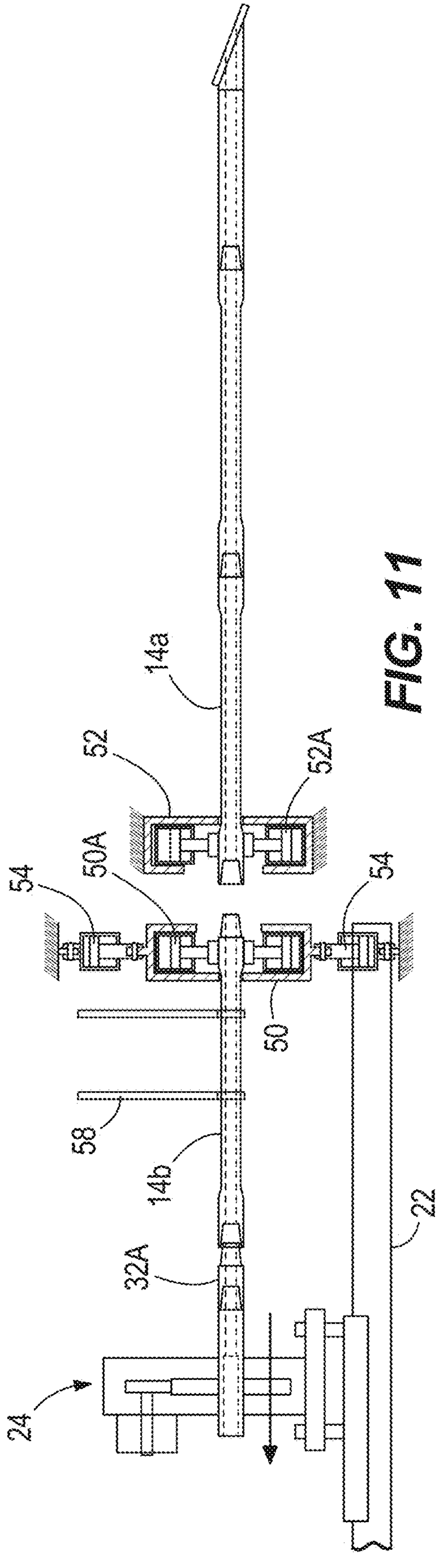
FIG. 11 is a schematic view illustrating a further step in the process of breaking the second rod joint. The rotary drive is actuated to unthread the sub saver from the up-hole end of the drill rod.
Figure 12:
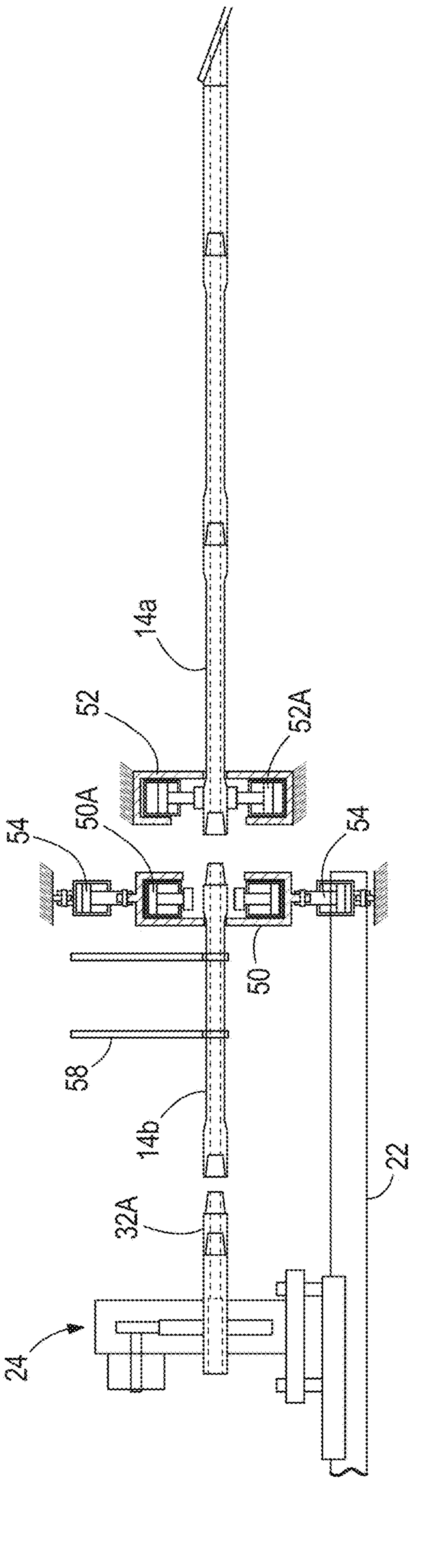
FIG. 12 is a schematic view illustrating a further step in the process of breaking the second rod joint. The sub saver is completely separated from the drill rod and the upper gripping unit is released.

To continue the process the reverse rotation from the rotational driver 24, along with the upward travel thereof along the rack 22, is continued until the drill rods 14*a*, 14*b* are completely unthreaded. Following the complete separation of the two drill rods 14*a* and 14*b*, additional steps are performed to decouple the rearward drill rod 14*b* from the sub saver 32A and off-load it to the storage location. FIG. 9 illustrates engagement of the rearward drill rod 14*b* by the rod loader arms 58. Subsequent to or concurrent with the engagement of the rearward drill rod 14*b* by the rod loader arms 58, the upper gripping unit 50 slides rearward to an alternate position. In other words, the upper gripping unit 50 follows the down-hole end of the rearward drill rod 14*b*, which has been moved further rearward in the drilling machine 10 due to detachment from the adjacent forward drill rod 14*a*. Once slid to the rearward position (which may be determined via the sensor 86), the upper gripping unit 50 re-clamps the down-hole end of the rearward drill rod 14*b* by actuation of the upper vise cylinders 50A as shown in FIG. 10. This fixes the rearward drill rod 14*b* against rotation, so that the up-hole end of the rearward drill rod 14*b* can be unthreaded from the sub saver 32A by reverse rotation of the sub saver 32A provided by the rotational driver 24. At this step the rotational driver 24 creates the torque necessary for the joint-break. FIG. 11 illustrates the sub saver 32A partially unthreaded from the rearward drill rod 14*b*, along with a corresponding rearward translation of the rotational driver 24 along the rack 22. FIG. 12 illustrates even further movement of the rotational driver 24 corresponding to a complete separation of the sub saver 32A from the rearward drill rod 14*b*. FIG. 12 also illustrates the release of the upper vise cylinders 50A from the rearward drill rod 14*b*, following the detachment of the rearward drill rod 14*b* from the sub saver 32A. At this state, the rearward drill rod 14*b* is only held by the rod loader arms 58. Once the upper gripping unit 50 is slid back to its forward position, the rod loader arms 58 move the rearward drill rod 14*b* out of alignment with the drill string 14 to the storage location. The rotational driver 24 is returned to the lowermost position such that the sub saver 32A can be threaded into the up-hole end of the next drill rod 14*a* so that this drill rod 14*a* can then be moved upward and broken from the drill string 14 according to the same process as just described.

Signals from some or all of the above noted sensors of FIG. 3 can be utilized during closed-loop control of an automatic rod exchange program executed by the drilling machine 10 via the controller 100 such that, without step by step inputs from a human operator, the drill rod 14*b* can be broken from the drill rod 14*a* and placed back into the storage location. Moreover, the automatic rod exchange program can utilize signals from some or all of these sensors to monitor the particular nature of the joint-break routine by which the drill rod 14*b* is to be initially unthreaded from the drill rod 14*a*. In doing so, the program may use an algorithm to characterize an operating profile to either confirm the occurrence of a normal joint-break or identify the occurrence of an abnormality in the joint-break routine (including abnormal joint-break or unsuccessful attempted joint-break). In some aspects, the algorithm can further characterize the particular type of abnormality in the joint-break routine. It should also be noted that aspects such as the algorithm's ability to characterize the operating profile during a joint-break routine is not limited to a closed-loop automatic process, but also during manual control in which an operator inputs commands for the individual break-out process steps. In a less than fully-automatic procedure, benefits of equipment protection and assessment can still be enjoyed, and an informational output can be provided to the operator.

During a joint-break routine of a break-out process (e.g., operator-controlled steps, or at least partially automated) configured to break a rod joint with the upper and lower gripping units 50, 52 as shown in FIG. 6, the particular parameters of torque at the upper gripping unit 50 and rotational position of the rotational driver 24 are monitored by the controller 100 to obtain and interpret time-based plots thereof. The torque at the break-out drive mechanism 54 is sensed by the break-out cylinder torque sensor 84 (measuring torque, or in the illustrated embodiments a cylinder pressure transducer measuring a cylinder pressure that correlates directly to torque), and the rotational position of the rotational driver 24 is sensed by the rotational position sensor 68. The controller 100 can contain on a memory device, as described above, torque and/or rotational position profiles considered "normal" or expected—i.e., indicative of what should occur when all components are functioning properly and the threaded joint is successfully broken by the application of break-out torque from the upper gripping unit 50. The pressure profile of the break-out drive mechanism 54 when comparing a successful scenario versus an abnormal scenario is distinguishable due to the dynamic pressure spike followed by the pressure trace immediately following the spike, as is described below with respect to specific possible scenarios. The analysis can help prevent damage to drill components, including drill rods.

Successful joint-break routines include: A) joint properly loosened, from tight starting condition, by the upper vise rotation (FIG. 13): B) partial vise slip, then catches and properly loosened by the upper vise rotation (FIG. 14A slip at upper gripping unit 50, and FIG. 14B slip at lower gripping unit 52); and C) already loosened rod-to-rod joint further loosened by the upper vise rotation (FIG. 15). Unsuccessful joint-break routines include A) slip at upper gripping unit 50 during rotation (FIG. 16): B) slip at lower gripping unit 52 during rotation of upper gripping unit 50 (FIG. 17): C) rod-to-machine joint loosened instead of the rod-to-rod joint during rotation of upper gripping unit 50 (FIG. 18); and D) slip at upper gripping unit 50 during break-out of the rod-to-machine joint during rotation of the rotational driver 24. Slippage can be an indication of wear at the respective vise dies.

Aspects of the disclosure relate particularly to monitoring and control logic that occurs during energization of the break-out drive mechanism 54, e.g., pressurization of the break-out cylinders so they extend, causing the upper gripping unit 50 to rotate relative to the lower gripping unit 52. This step breaks the threaded joint as the first step in separating the rearward drill rod 14*b* from the drill string 14. One aspect of the process according to the present disclosure is to monitor the rotary drive 24 while the upper gripping unit 50 is being rotated for breaking the threaded joint. Some rotation in a reverse direction should be detected at the rotary drive 24, e.g., at the gearbox 30, as the upper gripping unit 50 rotates. Potential abnormalities during this step can stem from low clamping force on either of the upper or lower gripping units 50, 52, worn surfaces of the vise dies on either of the upper or lower gripping units 50, 52 (or presently compromised by mud/debris), or damage to the threads of either of the drill rods 14*a*, 14*b* being broken apart at the joint. It is also possible that the joint between the sub saver 32A and the drill rod 14*b* is loose, or that the joint to be broken between the drill rods 14*a*, 14*b* is already loose. In spite of all these possible scenarios, it is critical to confirm that the joint is broken properly, especially in, but not limited to, situations where the multi-step break-out process is to be fully or partially automated. If the drill rod joint is not properly broken by the joint-break routine, subsequent steps of the overall break-out process could result in separation between the drill rod 14*b* and the rotational driver 24 before the drill rod 14*b* is separated from the drill string 14. If that happens, then the drilling process would have to stop, and require an intervention, most likely including manual control to re-make that connection.

Figure 13:
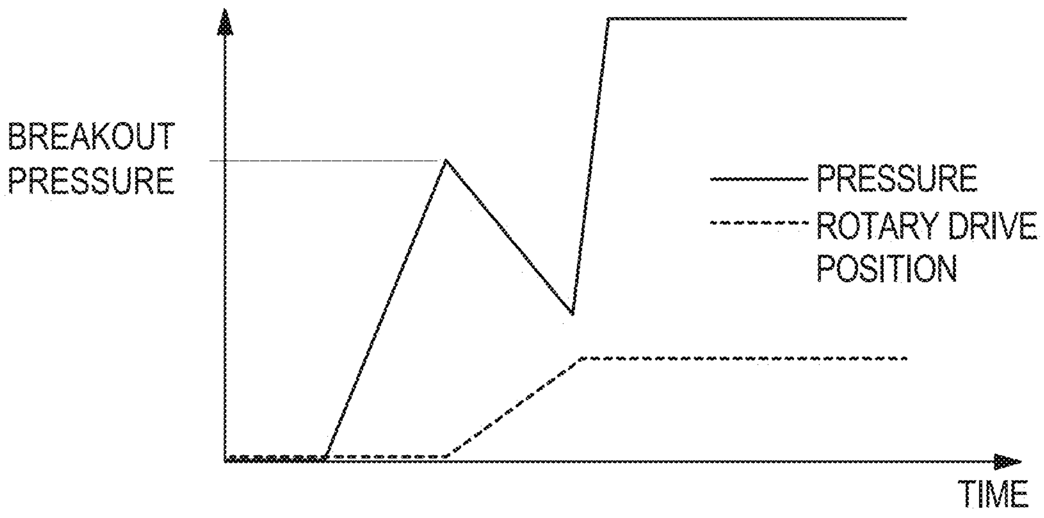
FIG. 13 is a plot of breakout cylinder pressure and rotary drive rotational position versus time for a normal rod joint breakout.

As generally mentioned above, the controller 100 monitors for a spike in the time-based plot of torque (e.g., pressure at break-out cylinders 54 from sensor 84). The spike is distinguishable due to the dynamic pressure increase followed by the pressures immediately following the spike. In one embodiment, the controller 100 may identify a joint-break by correlating the leading and/or trailing sides of the spike with time and/or movement detection of the rotational driver 24 obtained from the sensor 68. For example, FIG. 13 illustrates a normal joint-break routine in which pressure increases (e.g., generally linearly) to a sharp local maximum just before dropping significantly (e.g., generally linearly) as the rotary drive position begins changing. Rotary drive position remains unchanged during the leading side of the pressure spike as pressure is built-up to increase torque up to the amount necessary to break the joint. The slope on the leading and/or trailing sides of the spike may also have values within a prescribed range, stored to memory and accessible by the processor of the controller 100. Following the pressure decrease during initial rotational movement, pressure again increases sharply corresponding to the end of stroke of the break-out cylinders 54, where rotary drive rotational position stops changing. The controller 100 may execute an algorithm to monitor for some or all of these unique features of the torque and rotary position profiles from the sensors 84, 68 when carrying out the joint-break characterization process, as described below. The controller 100 can identify a time-based pressure spike of a magnitude and shape that is indicative of the expected break-out torque. In response to a normal joint-break being identified by the controller 100, any automation process in action is allowed to continue, without interruption or further intervention by the operator.

Figure 19:
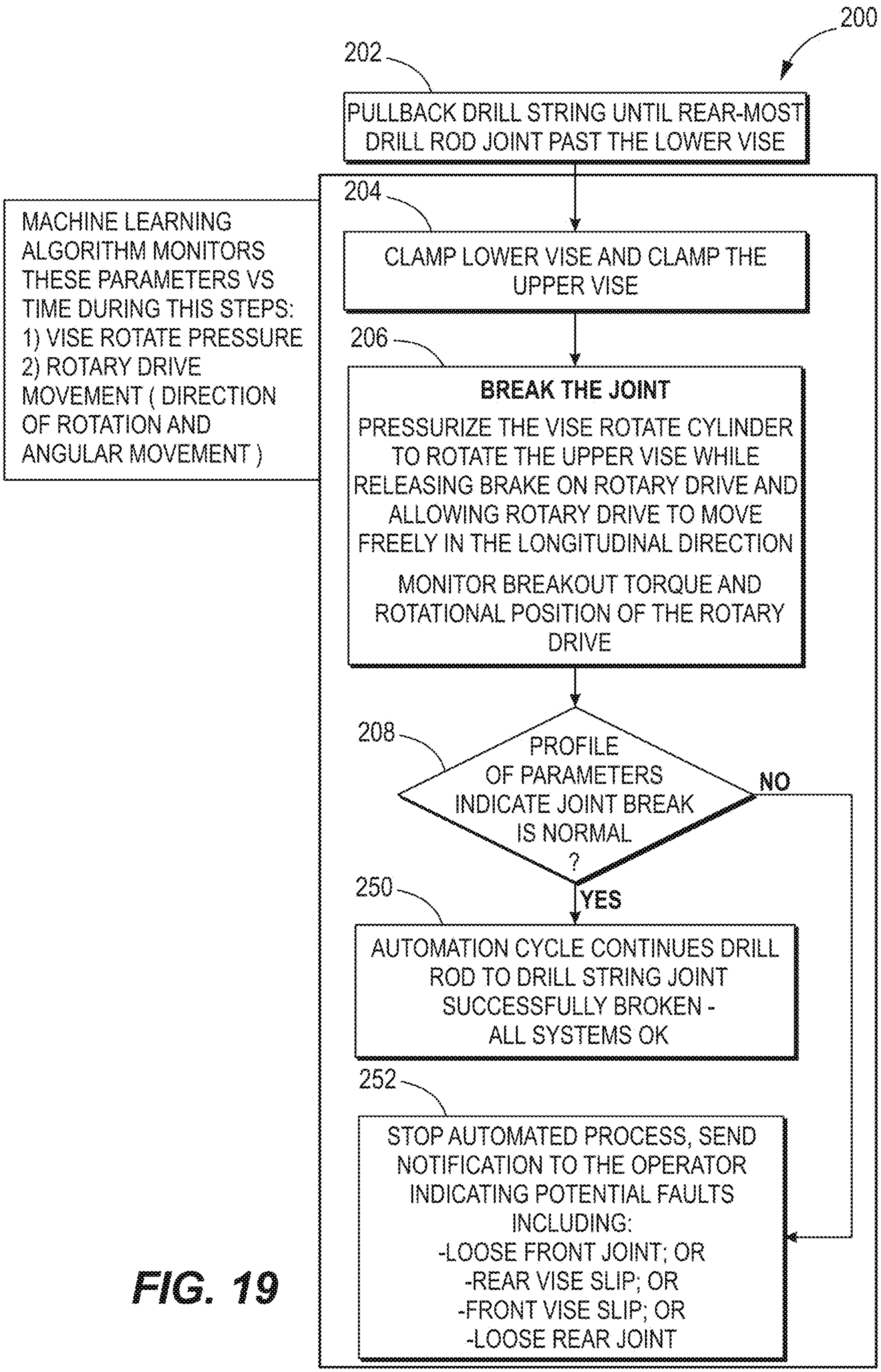
FIG. 19 is a flow chart illustrating a process of monitoring for abnormal operation while breaking rod joints during pullback.
Figure 21:
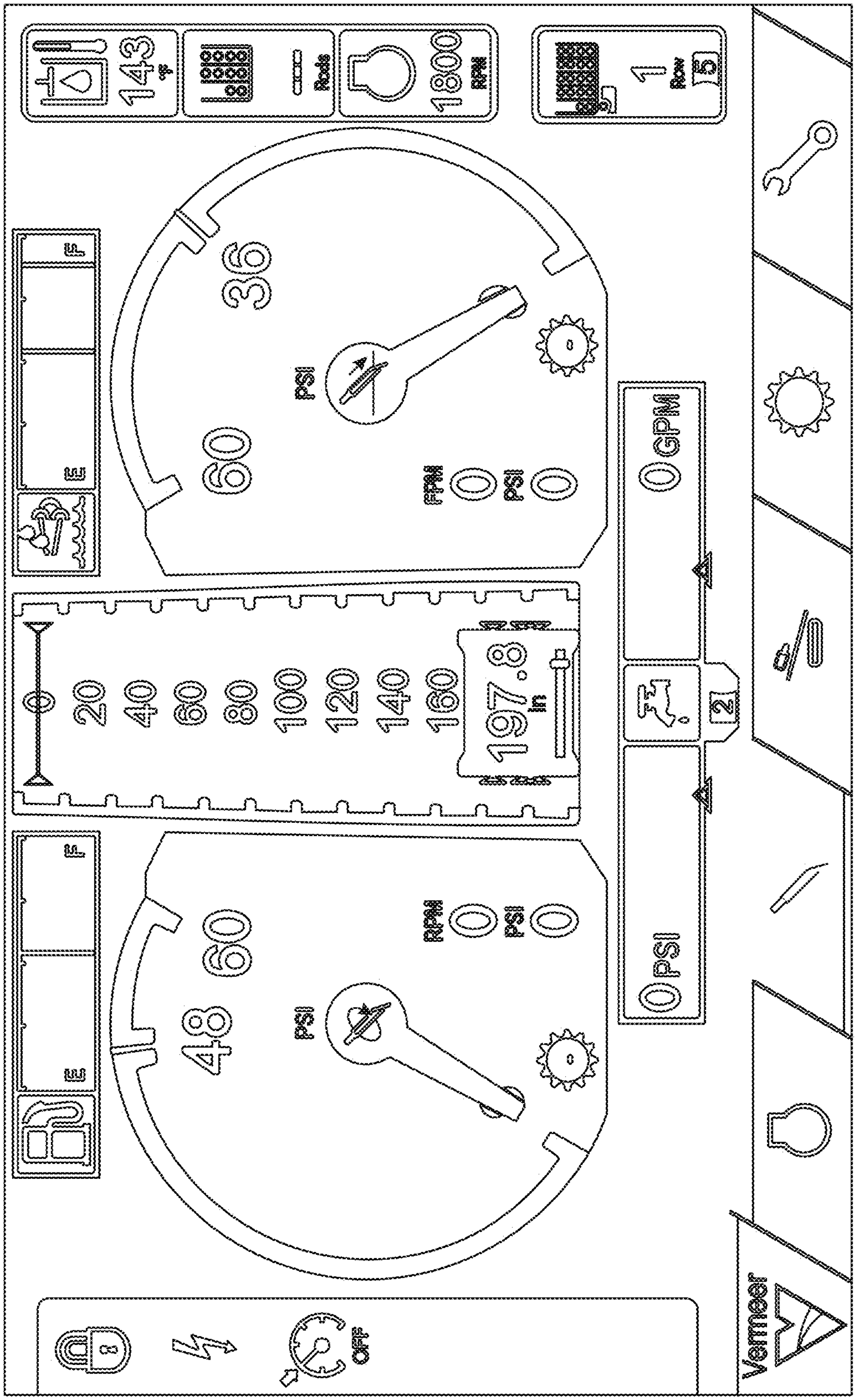
FIG. 21 is a view of a user interface, under normal conditions prior to an alert generated regarding abnormal break-out.
Figure 22:
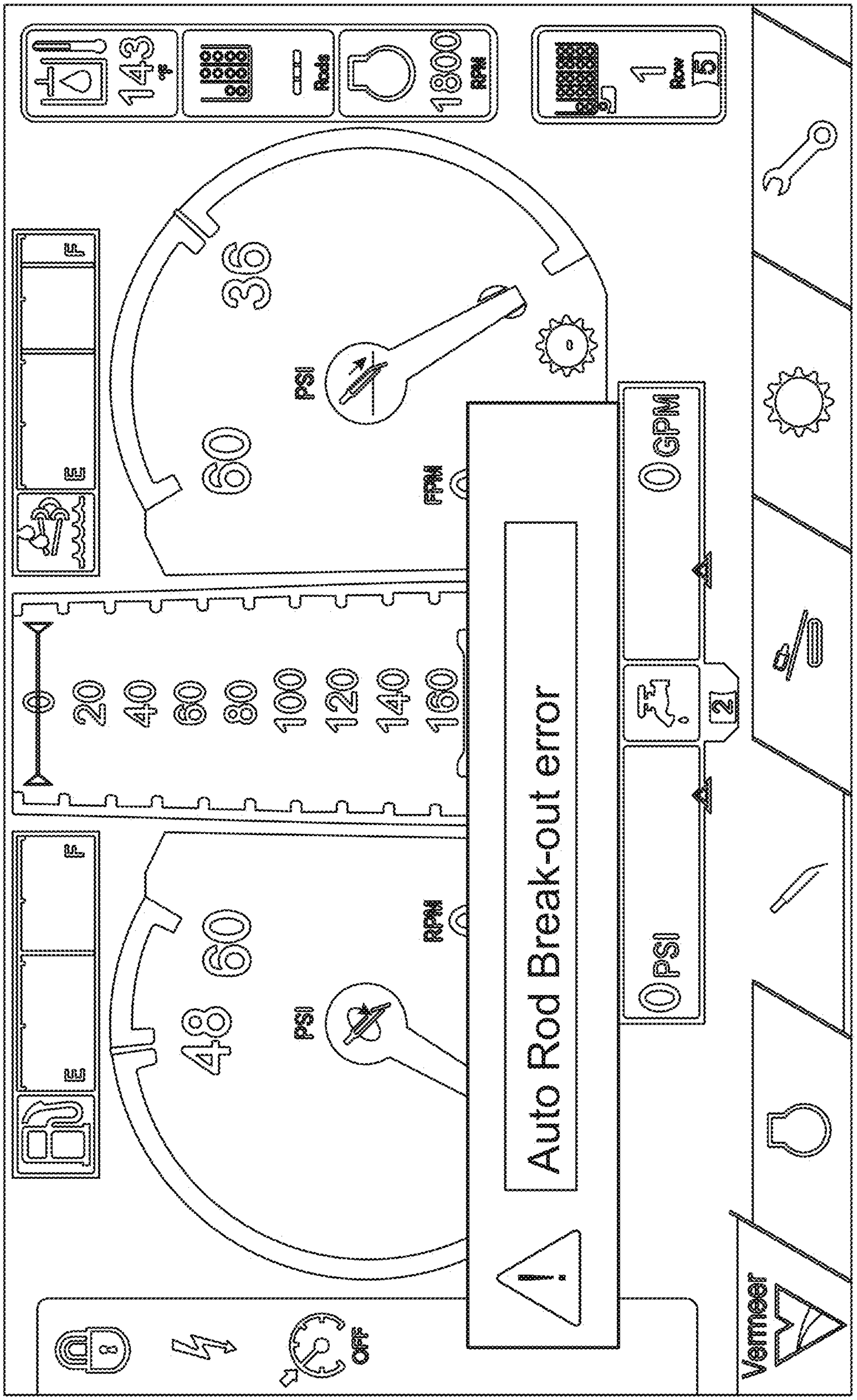
FIG. 22 is a view of the user interface including an alert generated by the controller when abnormal conditions are detected during an attempted joint break.

As shown in the process 200 of FIG. 19, the controller 100 can determine whether the joint-break routine is normal or abnormal, and take discrete actions corresponding to the determination. At step 202, the controller 100 pulls back the drill string 14 until the rearmost drill rod joint is past the lower gripping unit 52. At step 204, the controller 100 clamps both gripping units 50, 52. At step 206, the controller 100 enacts the joint-break routine by energizing the break-out drive mechanism 54 (e.g., pressurizing cylinders) while the gripping units 50, 52 are clamped closed. During step 206, the controller 100 also monitors the parameters of break-out torque via the sensor 84 and rotational position of the rotary drive 24 via the sensor 68. At step 208, the controller 100 determines whether the monitored parameters are indicative of a normal joint break. If YES at step 208, the controller 100 allows the automation cycle to continue at step 250. If NO at step 208, the controller 100 stops the automated process at step 252. At step 252, the controller 100 may also send notification to the operator (e.g., via a user display local to the machine 10 or on a remote computer or handheld electronic device) including potential faults. See for example the display in FIGS. 21 and 22 (FIG. 21 illustrating the display prior to the notification).

In further embodiments of the present disclosure, the controller 100 may identify individual abnormal scenarios, either from the profile of the parameters of break-out torque and rotational position of the rotary drive 24 during the joint-break routine, or in conjunction with additional sensed parameters and/or additional diagnostic steps.

Figure 14A:
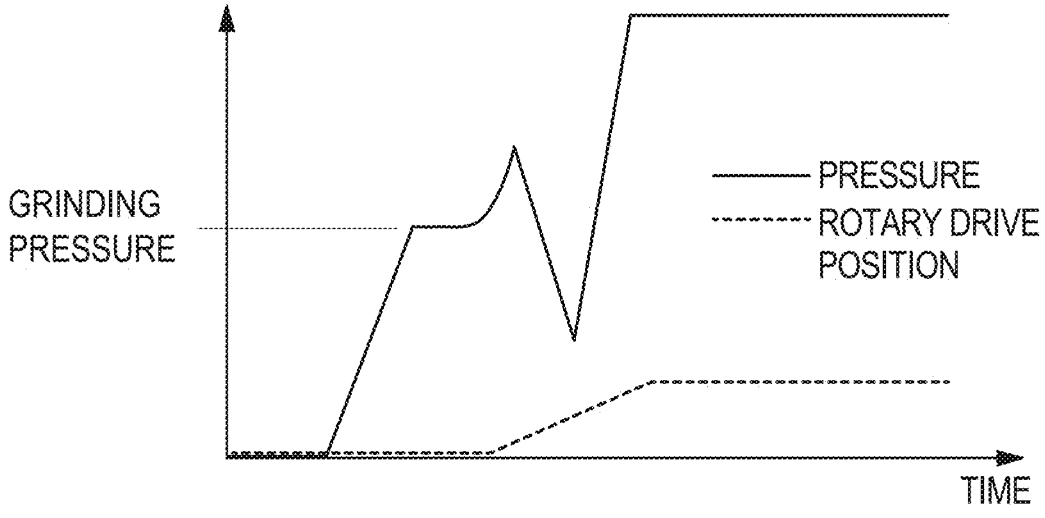
FIG. 14A is a plot of breakout cylinder pressure and rotary drive rotational position versus time for a rod joint breakout featuring partial slip at the upper/rear gripping unit before successful breakout.
Figure 14B:
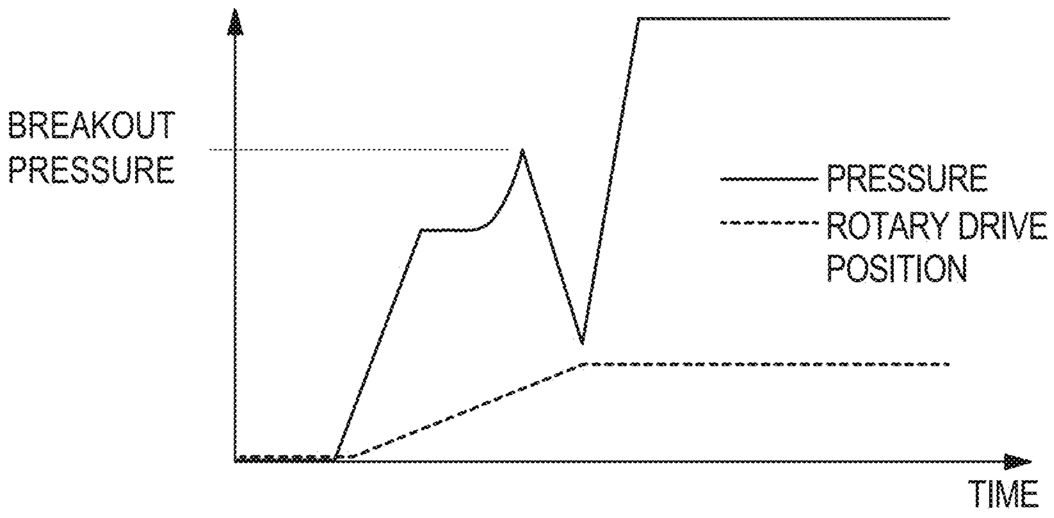
FIG. 14B is a plot of breakout cylinder pressure and rotary drive rotational position versus time for a rod joint breakout featuring partial slip at the lower/front gripping unit before successful breakout.
Figure 15:
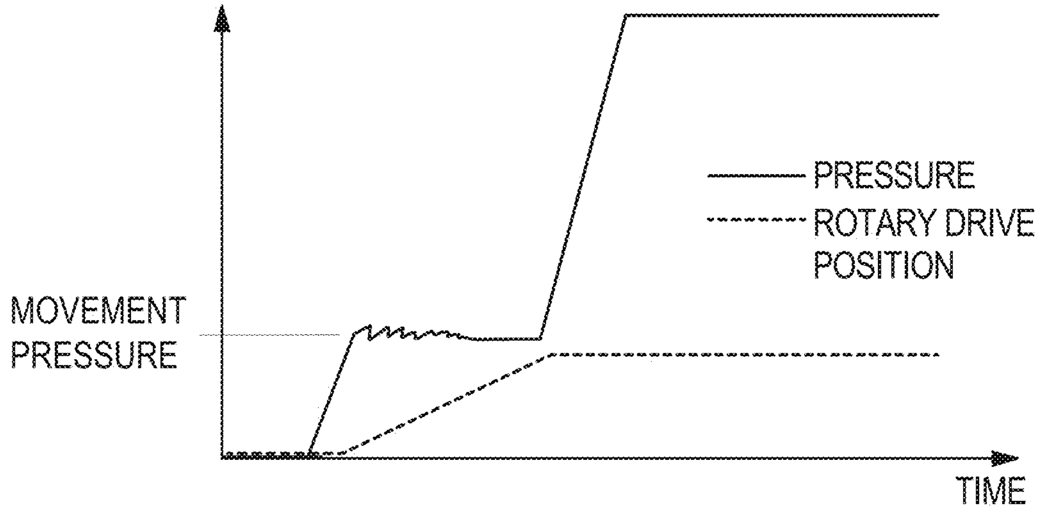
FIG. 15 is a plot of breakout cylinder pressure and rotary drive rotational position versus time for a rod joint breakout in which the joint is already loose.

In some aspects, the controller 100 may determine a partial slip prior to breaking the joint by identifying the plots of pressure and rotary drive position as they appear in FIG. 14A or FIG. 14B. In the case where there is partial slip at the upper gripping unit 50 (FIG. 14A), the controller 100 may identify the pressure increasing, then flattening out, before ultimately spiking around the time of rotary drive movement. The leading side of the pressure spike may thus be identified as having a portion that is flat or interrupting the linear profile, and furthermore this portion coincides with a lack of rotary position change at the rotary drive 24. Conversely, when there is partial slip at the lower gripping unit 52 (FIG. 14B), the controller 100 may identify similar shape characteristics on the leading side of the pressure spike as those described above with respect to FIG. 14A, but accompanied by rotational position change at the rotary drive 24. In response to the controller 100 determining the partial slip prior to breaking the joint, any automation process in action is allowed to continue, without interruption or further intervention by the operator. However, the controller 100 may log the occurrence of a detected vise slippage event, either internally or via communication to an external device.

In identifying the condition where the joint is already broken, the controller 100 identifies the lack of a pressure spike before movement of the rotary drive 24 is detected, as shown in of FIG. 15. In response to the controller 100 identifying the joint is already broken, any automation process in action is allowed to continue, without interruption or further intervention by the operator. However, the controller 100 may log the occurrence of a loose connection event, either internally or via communication to an external device. It is noted that the plots of FIGS. 13 to 15, along with the similar plots for additional scenarios discussed below, can be indicative of smoothed or noise-filtered data, as performed by the processor on the raw incoming data from the sensor(s) 84, 68.

Figure 16:
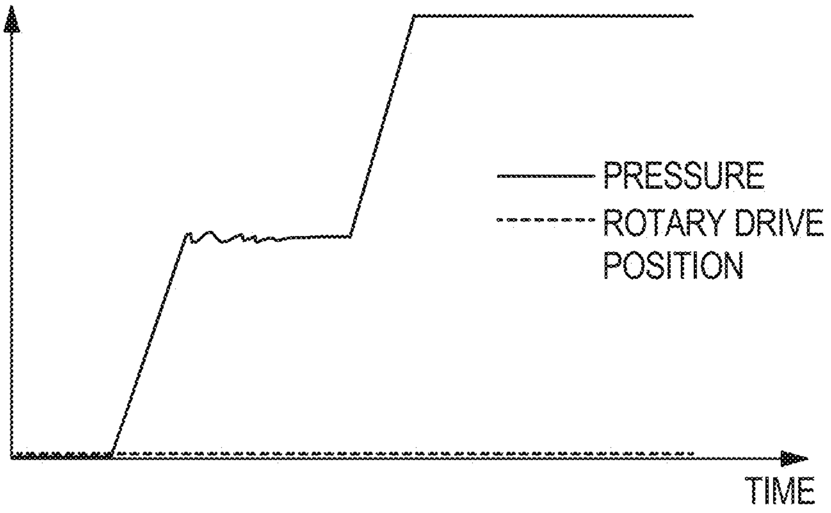
FIG. 16 is a plot of breakout cylinder pressure and rotary drive rotational position versus time for an unsuccessful rod joint breakout attempt, featuring slip at the upper/rear gripping unit.
Figure 17:
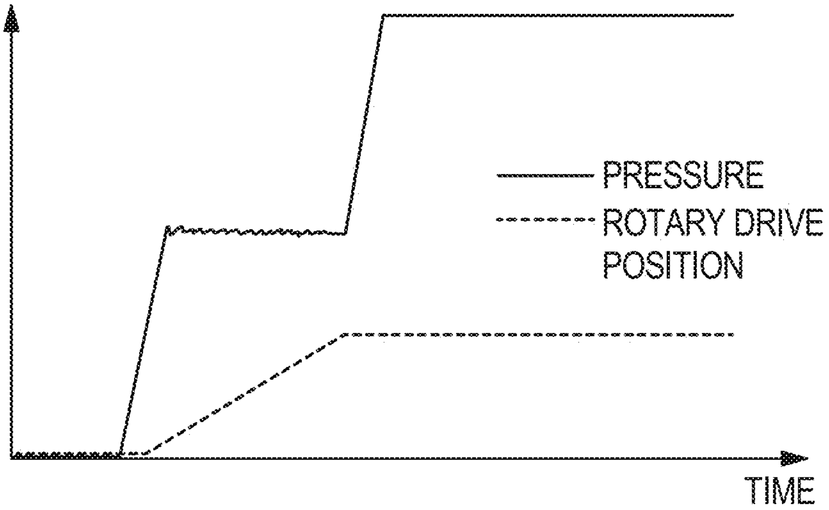
FIG. 17 is a plot of breakout cylinder pressure and rotary drive rotational position versus time for an unsuccessful rod joint breakout attempt, featuring slip at the lower/front gripping unit.

On the other hand, in response to the controller 100 identifying the lack of a pressure spike that is, as shown in FIG. 16, accompanied by no rotary drive position change, the controller 100 determines that there is slippage at the upper gripping unit 50, and the controller 100 halts any automation process in action. A notification is output to a user display (local to the drilling machine 10 or on a remote computer or handheld electronic device) by the controller 100. See for example the display in FIGS. 21 and 22 (FIG. 21 illustrating the display prior to the notification). In one embodiment, the display is in electronic communication with the controller 100. In some constructions, this display is a touch screen, and the operator is able to touch the warning icon to reveal a more detailed explanation of what happened on the display, e.g., "Slippage At Upper Vise." In response to the controller 100 identifying the lack of a pressure spike, but rather a flat pressure plot, of a magnitude less than the expected break-out torque (e.g., but greater than that of the loose joint condition of FIG. 15), during the start of rotational position change in the rotational driver 24 as shown in FIG. 17, the controller 100 determines that there is slippage at the lower gripping unit 52, and the controller 100 halts any automation process in action. A notification is output to the user display (See again FIG. 22) by the controller 100. Further messaging may be available via the display, e.g., "Slippage At Lower Vise."

Figure 18:
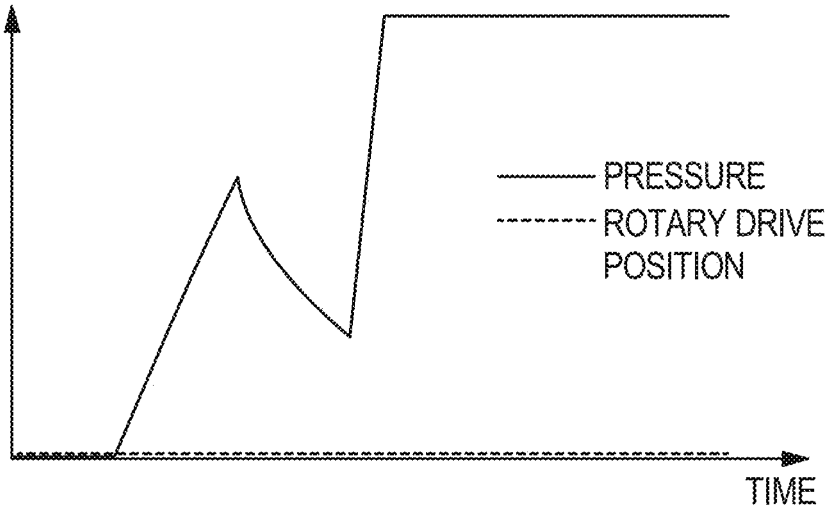
FIG. 18 is a plot of breakout cylinder pressure and rotary drive rotational position versus time for an unsuccessful rod joint breakout attempt, where the up-hole rod has a loose connection to the machine.

In response to the controller 100 identifying a pressure spike that is indicative of the expected break-out torque and that is accompanied by no rotary drive position change as shown in FIG. 18, the controller 100 determines that there is a loose rear joint between the drill rod 14*b* and the sub saver 32A, and the controller 100 halts any automation process in action. A notification is output to the user display (See again FIG. 22) by the controller 100. Further messaging may be available via the display, e.g., "Reattach Drill String to Sub Saver." This circumvents risk of dropping the drill rod 14*b* during a subsequent operation.

Figure 20:
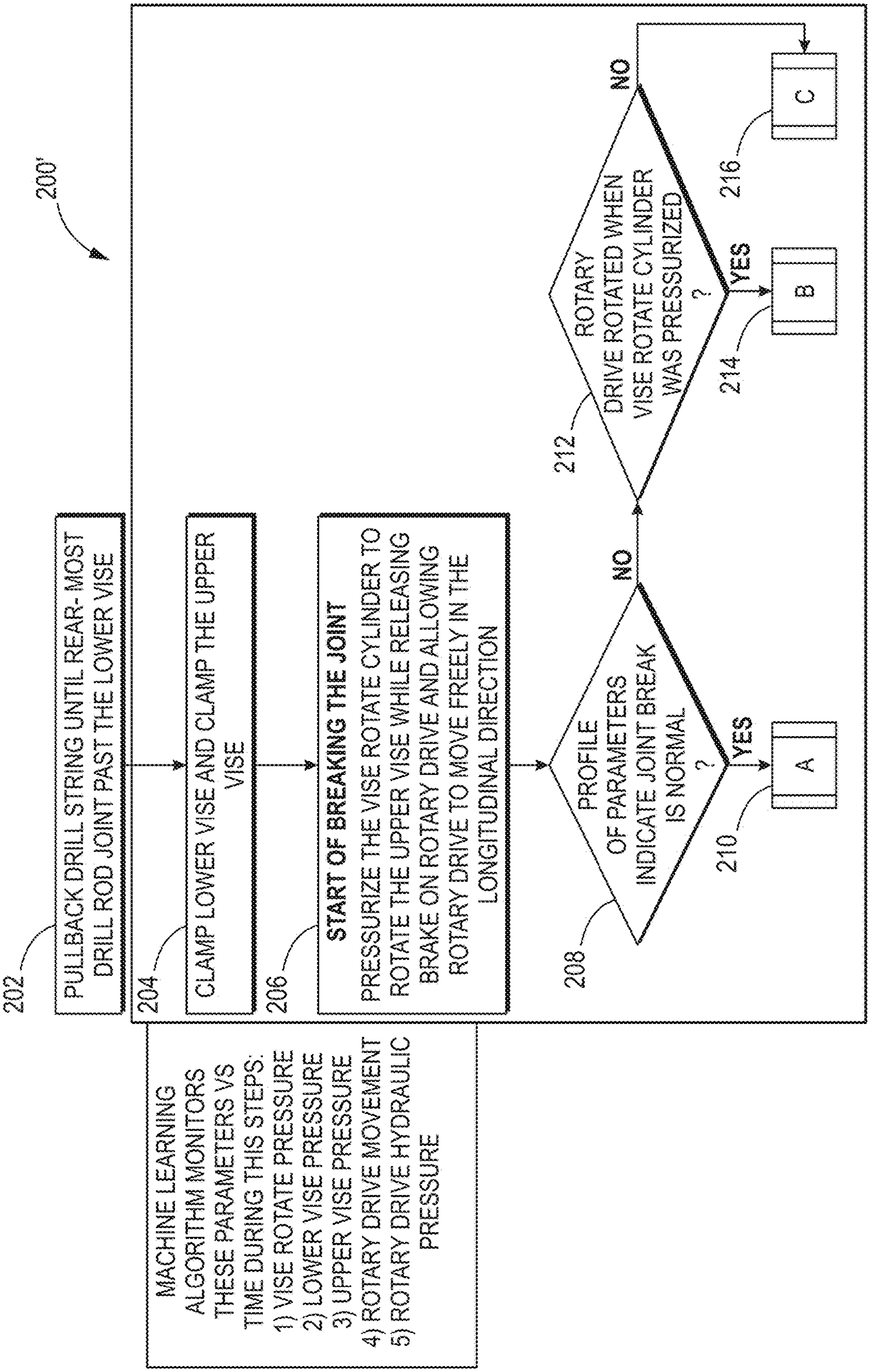
FIG. 20 is an alternative embodiment of a flow chart illustrating a process of monitoring for abnormal operation while breaking rod joints during pullback.

As noted at the left side of FIG. 20, the controller 100 may additionally monitor upper and lower vise pressure and the rotary drive hydraulic pressure during pullback, and particularly during the joint-break routine. In some embodiments, stroke length (position) of the break-out cylinders can be monitored, alone or in combination with other parameters such as the cylinder pressure that applied the torque to the upper gripping unit 50. In some constructions, stroke length (position) of the break-out cylinders (or another device providing the break-out drive mechanism) may be correlated with torque (e.g., cylinder pressure) in order to characterize an attempted break-out. For example, the controller 100 can determine slip of the upper gripping unit 50 by identifying an excessive amount or early timing of stroke movement with respect to the cylinder pressure.

Beyond the monitoring of break-out parameters during the attempted break-out with both gripping units 50, 52 clamped, the controller 100 may apply a controlled and low torque to the joint after releasing the drill rod 14*b* from the upper gripping unit 50 to evaluate whether the sub saver 32A is free to rotate as a means of distinguishing a loose joint from a situation where the vise dies slipped. If no rotation at the gearbox 30 during rotation of the upper gripping unit 50, but the sub saver 32A rotates at low torque with the upper gripping unit 50 opened, then the connection to the sub saver 32A must be loose. If no rotation at the gearbox 30 during rotation of the upper gripping unit 50, and no rotation of the sub saver 32A at low torque with the upper gripping unit 50 opened, then the vise dies must have slipped. If there is rotation at the gearbox 30 during rotation of the upper gripping unit 50, but no rotation of the sub saver 32A at low torque with the upper gripping unit 50 opened, then perhaps the joint is not completely broken free, or the threads at that joint are significantly damaged. If there is rotation at the gearbox 30 during rotation of the upper gripping unit 50, and there is rotation at the sub saver 32A at low torque with the upper gripping unit 50 opened, then the joint must have been broken completely, and that threaded joint must be in normal/good condition. An exemplary process for carrying out such methodology is illustrated in FIG. 20 as the process 200' executed by the controller 100.

In the process 200', the controller 100, after processing through steps 202, 204, 206, and 208 to start breaking the joint, first determines whether the parameter profiling indicates a normal joint break (YES at step 208 and proceed to track A at step 210), or not (NO at step 208 and proceed to further analyze at step 212 whether rotational position change occurred at the rotary drive 24 when the break-out drive mechanism 54 was energized at step 206). If YES at step 212, then the process follows track B at step 214, and if NO at step 212, then the process follows track C at step 216.

Figure 20A:
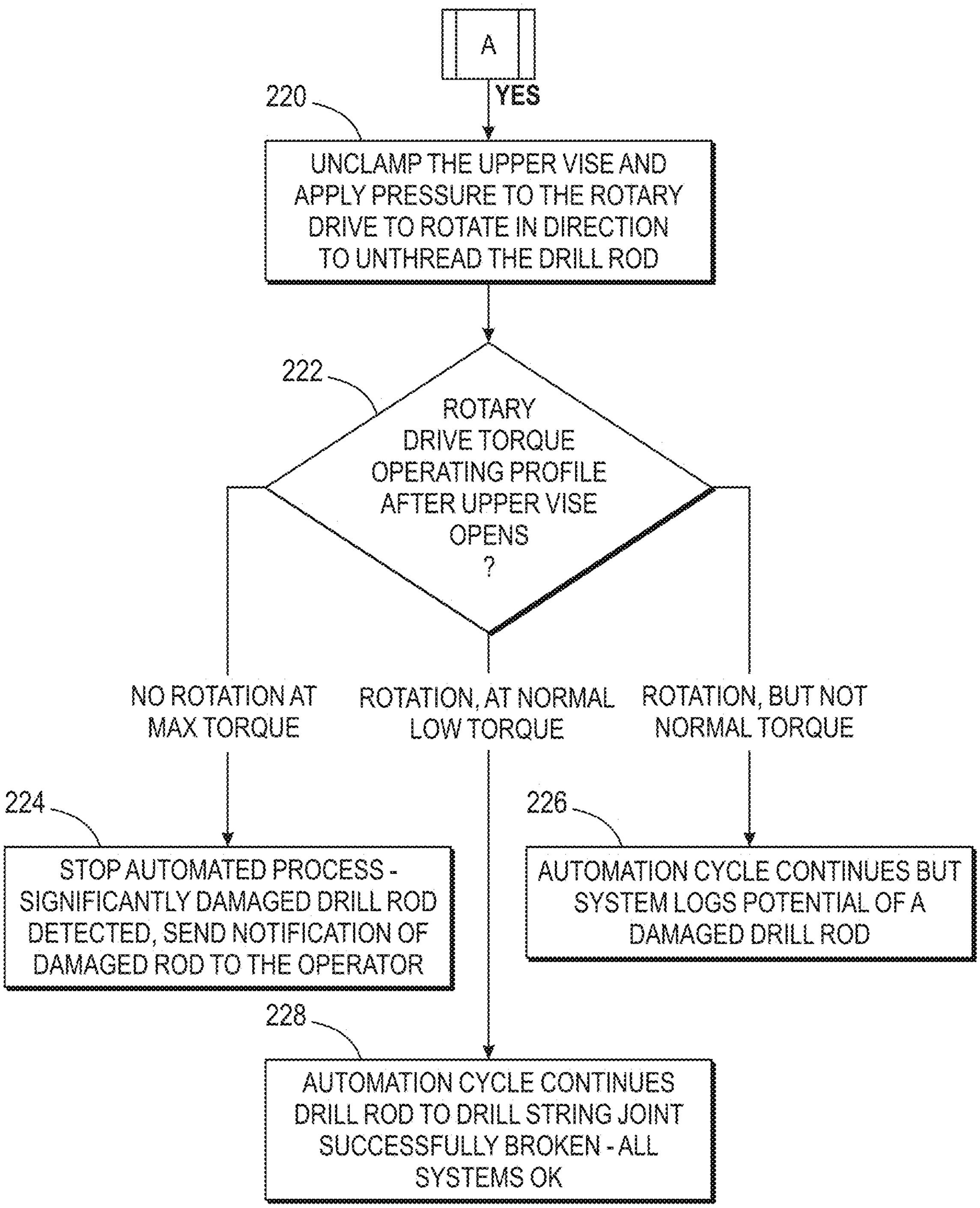
FIG. 20A is an extension of the FIG. 20 flow chart stemming from indication that the profiled parameters indicate a normal joint break.

Track A is further illustrated in FIG. 20A and includes steps 220 to 228 to complete a full break-out of the rearward drill rod 14*b*. In particular, the upper gripping unit 50 is released and the rotary drive 24 is operated to unthread the drill rod 14*b* at step 220. Then at step 222, the rotary drive torque operating profile is analyzed, with three possible results. If there is no rotational position change at maximum torque, the automated process is stopped at 224 and a notification of damaged drill rod is provided to the operator via the display. If there is rotational position change but abnormal torque, the automated process continues at step 226 and the system logs potential of a damaged drill rod. If there is rotational position change and normal low torque (e.g., at or below a prescribed threshold) the automated process continues as normal at step 228.

Figure 20B:
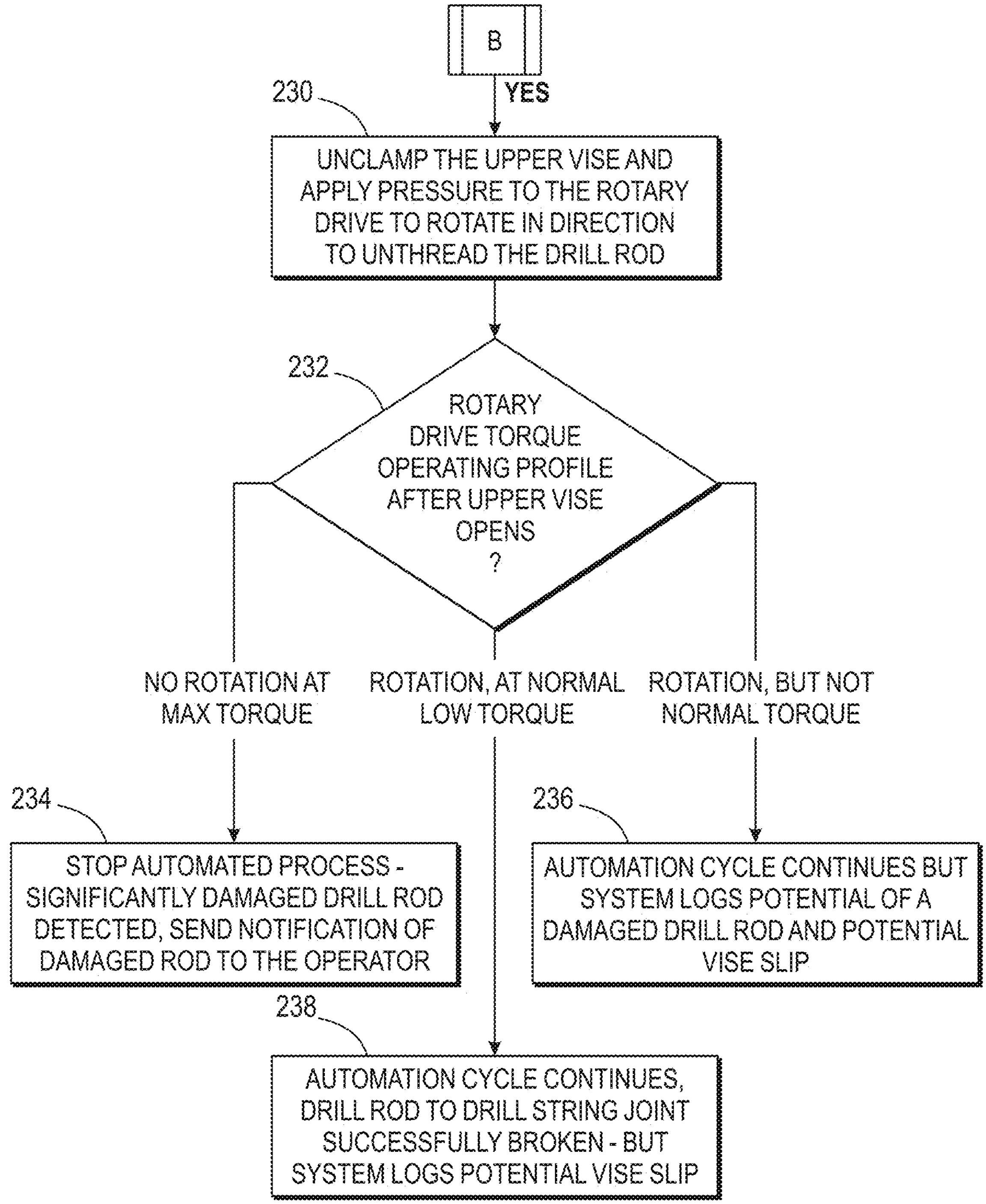
FIG. 20B is an extension of the FIG. 20 flow chart stemming from indication that the profiled parameters indicate an abnormal joint break and rotation at the rotary drive.

Track B is further illustrated in FIG. 20B and includes steps 230 to 238 to complete a full break-out of the rearward drill rod 14*b*. In particular, the upper gripping unit 50 is released and the rotary drive 24 is operated to unthread the drill rod 14*b* at step 230. Then at step 232, the rotary drive torque operating profile is analyzed, with three possible results. If there is no rotational position change at maximum torque, the automated process is stopped at 234 and a notification of damaged drill rod is provided to the operator via the display. If there is rotational position change but abnormal torque, the automated process continues at step 236 and the system logs potential of a damaged drill rod and a potential vise slip. If there is rotational position change and normal low torque (e.g., at or below a prescribed threshold) the automated process continues as normal at 238, but the system logs potential vise slip as the abnormality at step 208 is further understood.

Figure 20C:
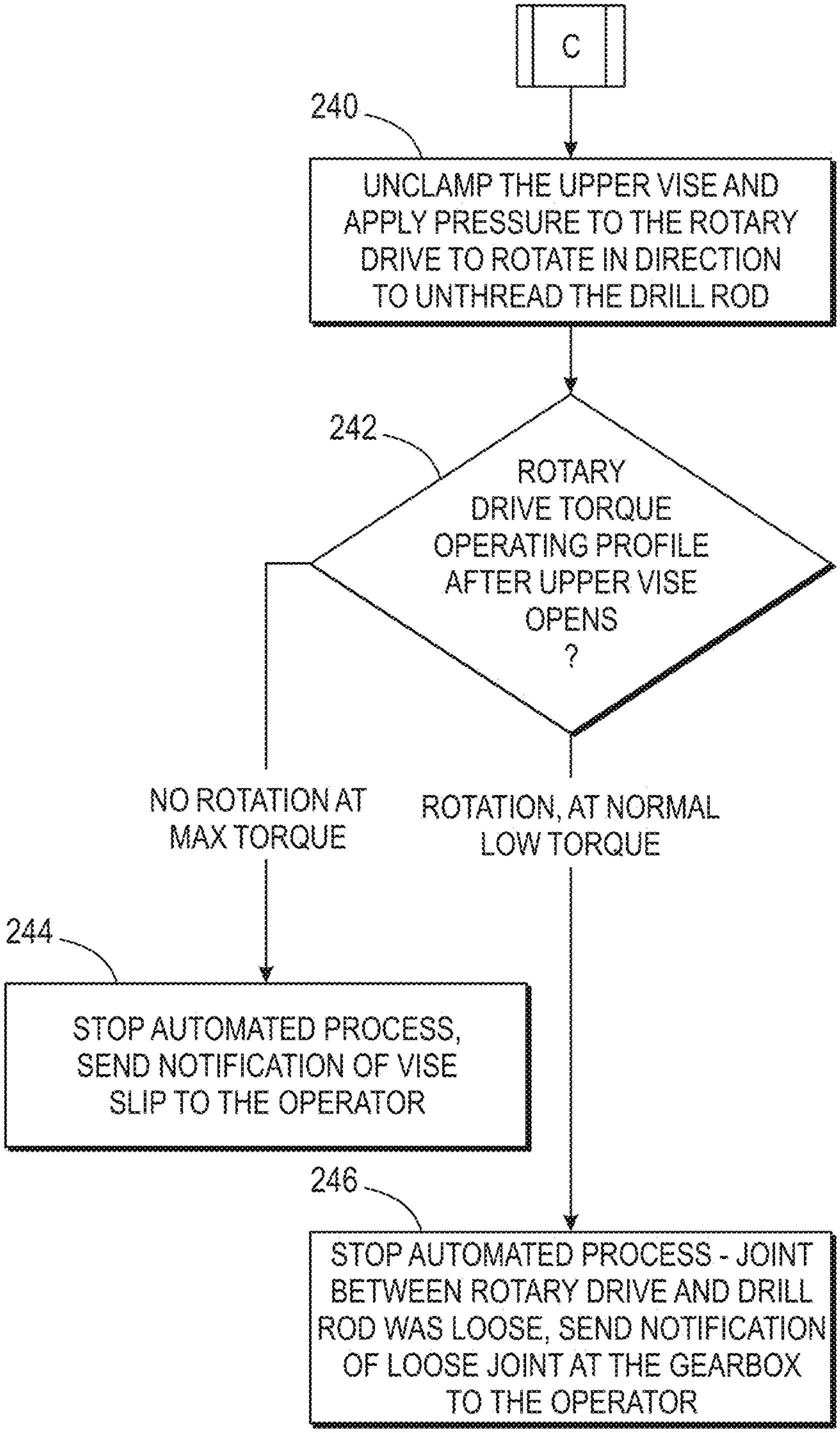
FIG. 20C is an extension of the FIG. 20 flow chart stemming from indication that the profiled parameters indicate an abnormal joint break and no rotation at the rotary drive.

Track C is further illustrated in FIG. 20C and includes steps 240 to 246 to further interpret the lack of rotation noted at step 212. In particular, the upper gripping unit 50 is released and the rotary drive 24 is operated to unthread the drill rod 14*b* at step 240. Then at step 242, the rotary drive torque operating profile is analyzed, with two possible results. If there is no rotational position change at maximum torque, the automated process is stopped at 244 and a notification of vise slip is provided to the operator via the display. If there is rotational position change and normal low torque (e.g., at or below a prescribed threshold) the automated process is stopped at 246, as the system further interprets that the abnormality at step 208 is attributable to the joint between the rotary drive 24 (sub saver 32A) and the drill rod 14*b* being loose. A corresponding notification is provided by the controller 100 to the operator via the display.

In some constructions, the drilling machine 10 includes a transducer operable to measure the rotational position of the upper gripping unit 50 such that the rotational position signal from such a transducer may replace or work in conjunction with the functions provided by the sensor 68 for rotational position of the rotational driver 24 described above.

Although aspects of the preceding description are given in the context of a joint-break routine exercised by energizing the break-out drive mechanism 54 (i.e., to break the threaded joint between two drill rods), similar controller algorithms and control steps can be implemented with respect to the unthreading of the up-hole end of a drill rod from the rotational driver 24, particularly the sub saver 32A, where the joint-break routine includes application of torque from energization of the rotational driver 24 while the up-hole drill rod is held fixed on the drilling machine. The need to break a threaded joint between the drill string 14 and the sub saver 32A occurs numerous times, both during the drilling process and during the pullback process. During such a joint-break routine, the controller 100 monitors the parameters of break-out torque and rotational position of the rotary drive 24. In this case, rotary drive rotational position can still be monitored via the sensor 68, while break-out torque may be monitored from a torque sensor such as a sensor configured to measure motor current in the rotary drive 24. In addition or in lieu thereof, holding torque at the upper vise 50 required to maintain the up-hole drill rod against rotation (e.g., from the sensor 84) during torque application by the rotary drive 24 may be monitored. As with the preceding disclosure, during a joint-break routine (e.g., operator-controlled steps, or at least partially automated) configured to break a drill rod to sub saver joint, the torque and rotational position of the rotational driver 24 are monitored by the controller 100 to obtain and interpret time-based plots thereof. The controller 100 can then determine whether or not the obtained profile(s) are characterized as "normal"—i.e., indicative of what should occur when all components are functioning properly and the threaded joint is successfully broken by the application of break-out torque from the rotary drive 24. The torque profile when comparing a successful scenario versus an abnormal scenario is distinguishable due to the expected dynamic torque spike which coincides with the beginning of rotary movement, similar to that described above for breaking drill rod joints with the break-out drive mechanism 54. However, in contrast to breaking drill rod joints with the break-out drive mechanism 54 where the cylinder bottoms out to cause a higher static pressure following the torque spike, the normal joint break between the sub saver 32A and the up-hole drill rod may instead have no further torque increase following the spike that occurs at the moment of joint break. The analysis can help prevent damage to drill components, including the sub saver 32A and the drill rod.

Machine learning capabilities may be incorporated into the drilling machine controller 100 so that the specific parameters and profiles can be more accurately understood/interpreted, generating more accurate responses by the algorithm. Furthermore, advanced analytics of the data collected during the break-out, and particularly the joint-break routine, can be conducted within the controller 100 of the drilling machine 10 and/or in offsite data analysis. This data can be used in identifying component manufacturing issues and predicting component lifetimes, among numerous other possibilities.

Changes may be made in the above methods and systems without departing from the scope hereof. Also, aspects of various embodiments may be combined unless expressly prohibited. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A drilling machine comprising:

a rotational driver for attaching to an up-hole end of a drill string made-up of a plurality of drill rods that are each secured to the next with a threaded joint;

a first vise configured to secure the drill string extending beyond the drilling machine;

a second vise configured to secure an up-hole rod at the up-hole end of the drill string;

a break-out drive mechanism operable when energized to apply torque to the second vise in a joint-break routine configured to rotate the second vise relative to the first vise to break the threaded joint between the up-hole rod and the drill string; and a control system with a control algorithm for evaluating the joint-break routine, the control algorithm comprising:

a process for monitoring an operating profile of torque applied to the up-hole drill rod by energization of the break-out drive mechanism during the joint-break routine while the drill string is being held by the first vise, a process for monitoring rotational position change at the rotational driver during the joint-break routine, a process for characterizing the joint-break routine as normal or abnormal based on the monitored operating profile of torque and the monitored rotational position change at the rotational driver, and a process, responsive to the characterizing process characterizing the joint-break routine as abnormal, for interrupting a break-out process for removing the up-hole rod from the drill string and/or providing a notification to a display notifying an operator, wherein the control system includes a further control algorithm for distinguishing among at least two different types of abnormal joint-break routines the further control algorithm comprising:

a process for determining whether the rotational driver was rotated during the joint-break routine, and a process for evaluating torque during energization of the rotational driver with the second vise unclamped following the joint-break routine.

2. The drilling machine of claim 1, wherein the break-out drive mechanism includes at least one hydraulic cylinder, and the operating profile of torque is in the form of pressure within the at least one hydraulic cylinder vs time.

3. The drilling machine of claim 1 where the notification indicates one of: loose joint at an up-hole end of the up-hole drill rod, loose joint at a down-hole end of the up-hole drill rod, slip at first vise, slip at second vise, partial slip at first vise prior to breaking the joint, or partial slip at second vise prior to breaking the joint.

4. The drilling machine of claim 1, wherein the process for characterizing the joint-break routine as normal or abnormal is configured to characterize the joint-break routine as normal when the monitored operating profile of torque includes a continuous rising torque to a spike that coincides with a start of rotational position change at the rotational driver as indicated by the monitored rotational position change.

5. The drilling machine of claim 1, wherein the process for characterizing the joint-break routine as normal or abnormal is configured to correlate the leading and/or trailing sides of a spike in the monitored operating profile of torque with time and/or the monitored rotational position change, and is configured to characterize the joint-break routine as normal on the basis of one or both of: A) unchanging rotational position change as torque increases to a maximum, and B) the slope of the torque spike with respect to time being within a prescribed range stored in a memory of the control system.

6. The drilling machine of claim 1, wherein the process for characterizing the joint-break routine as normal or abnormal is configured to correlate the leading and/or trailing sides of a spike in the monitored operating profile of torque with time and/or the monitored rotational position change, and is configured to characterize the joint-break routine as abnormal on the basis of one or both of: A) changing rotational position change as torque increases to a maximum, and B) the slope of the torque spike with respect to time being outside a prescribed range stored in a memory of the control system.

7. The drilling machine of claim 1, wherein the control algorithm comprises a process, responsive to the characterizing process characterizing the joint-break routine as normal, to continue an automated rod break-out process for removing the up-hole rod from the drill string.

8. The drilling machine of claim 1, wherein the process, responsive to the characterizing process characterizing the joint-break routine as abnormal, is configured to abort an automated rod break-out process and provide notification to the display.

9. The drilling machine of claim 1, wherein the control system incorporates a machine learning algorithm configured to track a plurality of joint-break routines and further update the control algorithm of the control system for evaluating future joint-break routines.

10. The drilling machine of claim 1, wherein the control system includes an algorithm to log joint-break routines characterized as abnormal, and log therewith an identification of a potential root cause based on the monitored operating profile of torque and the monitored rotational position change at the rotational driver during the joint-break routine.

11. A method of operating a drilling machine, the method comprising:

providing a drill string on the drilling machine, the drill string including a threaded joint between an up-hole drill rod at an up-hole end of the drill string and a remainder of the drill string, the up-hole drill rod attached to a rotational driver of the drilling machine;

clamping the remainder of the drill string with a first vise;

clamping the up-hole drill rod with a second vise;

energizing a break-out drive mechanism to apply torque to the second vise in a joint-break routine configured to rotate the second vise relative to the first vise to break the joint between the up-hole rod and the drill string;

operating a control system to execute a control algorithm that evaluates the joint-break routine, the execution of the control algorithm comprising:

monitoring an operating profile of torque applied to the up-hole drill rod by energization of the break-out drive mechanism during the joint-break routine while the drill string is being held by the first vise, monitoring rotational position change at the rotational driver during the joint-break routine, characterizing the joint-break routine as normal or abnormal based on the monitored operating profile of torque and the monitored rotational position change at the rotational driver, and responsive to the characterizing process characterizing the joint-break routine as abnormal, interrupting a break-out process for removing the up-hole rod from the drill string and/or providing a notification to a display notifying an operator; and operating the control system to execute a further control algorithm for distinguishing among at least two different types of abnormal joint-break routines, including the steps of:

determining whether the rotational driver was rotated during the joint-break routine, and evaluating torque during energization of the rotational driver with the second vise unclamped following the joint-break routine.

12. The method of claim 11, wherein the operating profile of torque is monitored in the form of hydraulic cylinder pressure of the break-out drive mechanism vs time.

13. The method of claim 11, wherein the notification is provided, the notification indicating one of: loose joint at an up-hole end of the up-hole drill rod, loose joint at a down-hole end of the up-hole drill rod, slip at first vise, slip at second vise, partial slip at first vise prior to breaking the joint, or partial slip at second vise prior to breaking the joint.

14. The method of claim 11, wherein characterizing the joint-break routine as normal or abnormal includes characterizing the joint-break routine as normal when the monitored operating profile of torque includes a continuous rising torque to a spike that coincides with a start of rotational position change at the rotational driver as indicated by the monitored rotational position change.

15. The method of claim 11, wherein characterizing the joint-break routine as normal or abnormal includes correlating the leading and/or trailing sides of a spike in the monitored operating profile of torque with time and/or the monitored rotational position change, the joint-break routine being characterized as normal on the basis of one or both of: A) unchanging rotational position change as torque increases to a maximum, and B) the slope of the torque spike with respect to time being within a prescribed range stored in a memory of the control system.

16. The method of claim 11, wherein characterizing the joint-break routine as normal or abnormal includes correlating the leading and/or trailing sides of a spike in the monitored operating profile of torque with time and/or the monitored rotational position change, the joint-break routine being characterized as abnormal on the basis of one or both of: A) changing rotational position change as torque increases to a maximum, and B) the slope of the torque spike with respect to time being outside a prescribed range stored in a memory of the control system.

17. The method of claim 11, wherein the execution of the control algorithm further comprises, responsive to characterizing the joint-break routine as normal, continuing an automated rod break-out process for removing the up-hole rod from the drill string.

18. The method of claim 11, wherein the execution of the control algorithm further comprises, responsive to the characterizing process characterizing the joint-break routine as abnormal, is configured to abort an automated rod break-out process and provide notification to the display.

19. The method of claim 11, wherein the execution of the control algorithm further comprises executing a machine learning algorithm that tracks a plurality of joint-break routines and further updates the control algorithm of the control system for evaluating future joint-break routines.

20. The method of claim 11, wherein the execution of the control algorithm further comprises logging joint-break routines characterized as abnormal, and logging therewith an identification of a potential root cause based on the monitored operating profile of torque and the monitored rotational position change at the rotational driver during the joint-break routine.

* * * * *